(12) United States Patent
Hsu et al.

(10) Patent No.: US 8,854,746 B2
(45) Date of Patent: Oct. 7, 2014

(54) IMAGE CAPTURING OPTICAL LENS SYSTEM

(71) Applicant: Largan Precision Co., Ltd., Taichung (TW)

(72) Inventors: Po-Lun Hsu, Taichung (TW); Hsin-Hsuan Huang, Taichung (TW)

(73) Assignee: Largan Precision Co., Ltd, Taichung (TW)

( * ) Notice: Subject to any disclaimer, the term of this patent is extended or adjusted under 35 U.S.C. 154(b) by 41 days.

(21) Appl. No.: 13/757,587

(22) Filed: Feb. 1, 2013

(65) Prior Publication Data

US 2014/0177076 A1    Jun. 26, 2014

(30) Foreign Application Priority Data

Dec. 25, 2012   (TW) .............................. 101149767 A

(51) Int. Cl.
*G02B 9/60*     (2006.01)
*G02B 13/18*    (2006.01)

(52) U.S. Cl.
CPC ..................................... *G02B 13/18* (2013.01)
USPC .......................................... 359/714; 359/764

(58) Field of Classification Search
CPC ............. G02B 9/60; G02B 9/62; G02B 9/64; G02B 13/0045
USPC .................. 359/708–714, 754–758, 763–766
See application file for complete search history.

(56) References Cited

U.S. PATENT DOCUMENTS

| | | | |
|---|---|---|---|
| 5,825,556 A | 10/1998 | Meyers | |
| 8,000,030 B2 | 8/2011 | Tang | |
| 8,179,470 B2 | 5/2012 | Chen et al. | |
| 2012/0243108 A1* | 9/2012 | Tsai et al. | ..................... 359/713 |
| 2013/0016261 A1* | 1/2013 | Tanaka et al. | ................. 348/294 |

FOREIGN PATENT DOCUMENTS

| | | |
|---|---|---|
| JP | 50-26534 | 3/1975 |
| JP | 56-123511 | 9/1981 |
| JP | 58-33211 | 2/1983 |
| JP | 63-274904 | 11/1988 |
| JP | 2012-37763 | 2/2012 |

* cited by examiner

*Primary Examiner* — Darryl J Collins
(74) *Attorney, Agent, or Firm* — Tim Tingkang Xia, Esq.; Morris Manning & Martin, LLP

(57) ABSTRACT

An image capturing optical lens system includes, in order from an object side to an image side, a first lens element, a second lens element, a third lens element, a fourth lens element and a fifth lens element. The first lens element with positive refractive power has a convex object-side surface. The second lens element with negative refractive power has a concave object-side surface. The third lens element has refractive power. The fourth lens element with refractive power has a concave object-side surface and a convex image-side surface. The fifth lens element with refractive power has a concave image-side surface, wherein an object-side surface and the image-side surface of the fifth lens element are aspheric, and the fifth lens element has at least one inflection point on the image-side surface thereof.

23 Claims, 18 Drawing Sheets

IMAGE CAPTURING OPTICAL LENS SYSTEM

RELATED APPLICATIONS

The application claims priority to Taiwan Application Serial Number 101149767, filed Dec. 25, 2012, which is herein incorporated by reference.

BACKGROUND

1. Technical Field

The present invention relates to an image capturing optical lens system. More particularly, the present invention relates to a compact image capturing optical lens system applicable to portable electronic products.

2. Description of Related Art

In recent years, with the popularity of mobile products with camera functionalities, the demand of optical lens systems is increasing. The sensor of a conventional photographing camera is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical lens systems have gradually evolved toward the field of higher megapixels, there is an increasing demand for compact optical lens systems featuring better image quality.

A conventional and compact optical lens system employed in a portable electronic product such as the one disclosed in the U.S. Pat. No. 8,179,470, mainly adopts a four-element lens structure. Due to the popularity of mobile products with high-end specifications, such as smart phones and PDAs (Personal Digital Assistants), the requirements for smaller pixel size and better image quality have been increasing. However, the conventional four-element lens structure cannot satisfy these requirements of the compact optical lens system.

Although other conventional optical lens systems with five-element lens structure such as the one disclosed in the U.S. Pat. No. 8,000,030 enhance image quality and resolving power, it still reside with unsolved problems. Since the arrangement of the lens elements which are close to the image side of the optical lens elements is not proper regarding the refractive index, it is not favorable for obtaining more of the image coverage. Furthermore, it is also not favorable for keeping the optical lens system compact due to the size of barrel. Therefore, a compact optical lens system which can be applied to the portable electronic products with larger refractive index on the image side of the optical lens system and with more of image coverage under limited peripheral regions of lens elements is called for solving the problems stated above.

SUMMARY

According to one aspect of the present disclosure, an image capturing optical lens system includes, in order from an object side to an image side, a first lens element, a second lens element, a third lens element, a fourth lens element and a fifth lens element. The first lens element with positive refractive power has a convex object-side surface. The second lens element with negative refractive power has a concave object-side surface. The third lens element has refractive power. The fourth lens element with refractive power has a concave object-side surface and a convex image-side surface. The fifth lens element with refractive power has a concave image-side surface, wherein an object-side surface and the image-side surface of the fifth lens element are aspheric, and the fifth lens element has at least one inflection point on the image-side surface thereof. When a refractive index of the fifth lens element is N5, the following relationship is satisfied:

$$1.60 < N5 < 1.75.$$

According to another aspect of the present disclosure, an image capturing optical lens system includes, in order from an object side to an image side, a first lens element, a second lens element, a third lens element, a fourth lens element and a fifth lens element. The first lens element with positive refractive power has a convex object-side surface. The second lens element has negative refractive power. The third lens element has refractive power. The fourth lens element with refractive power has a concave object-side surface and a convex image-side surface. The fifth lens element with refractive power has a concave image-side surface, wherein an object-side surface and the image-side surface of the fifth lens element are aspheric, and the fifth lens element has at least one inflection point on the image-side surface thereof. When a refractive index of the fifth lens element is N5, a focal length of the image capturing optical lens system is f, and a focal length of the fourth lens element is f4, the following relationships are satisfied:

$$1.60 < N5 < 1.75; \text{ and}$$

$$-1.0 < f/f4 < 0.40.$$

According to still another aspect of the present disclosure, an image capturing optical lens system includes, in order from an object side to an image side, a first lens element, a second lens element, a third lens element, a fourth lens element and a fifth lens element. The first lens element with positive refractive power has a convex object-side surface. The second lens element with negative refractive power has a concave object-side surface. The third lens element with positive refractive power has a convex object-side surface. The fourth lens element with refractive power has a convex image-side surface. The fifth lens element with refractive power has a concave image-side surface, wherein an object-side surface and the image-side surface of the fifth lens element are aspheric, and the fifth lens element has at least one inflection point on the image-side surface thereof. When a refractive index of the fifth lens element is N5, a central thickness of the fifth lens element is CT5, and a curvature radius of an object-side surface of the second lens element is R3, the following relationships are satisfied:

$$1.60 < N5 < 1.75; \text{ and}$$

$$-0.60 < CT5/R3 < -0.05.$$

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1A:
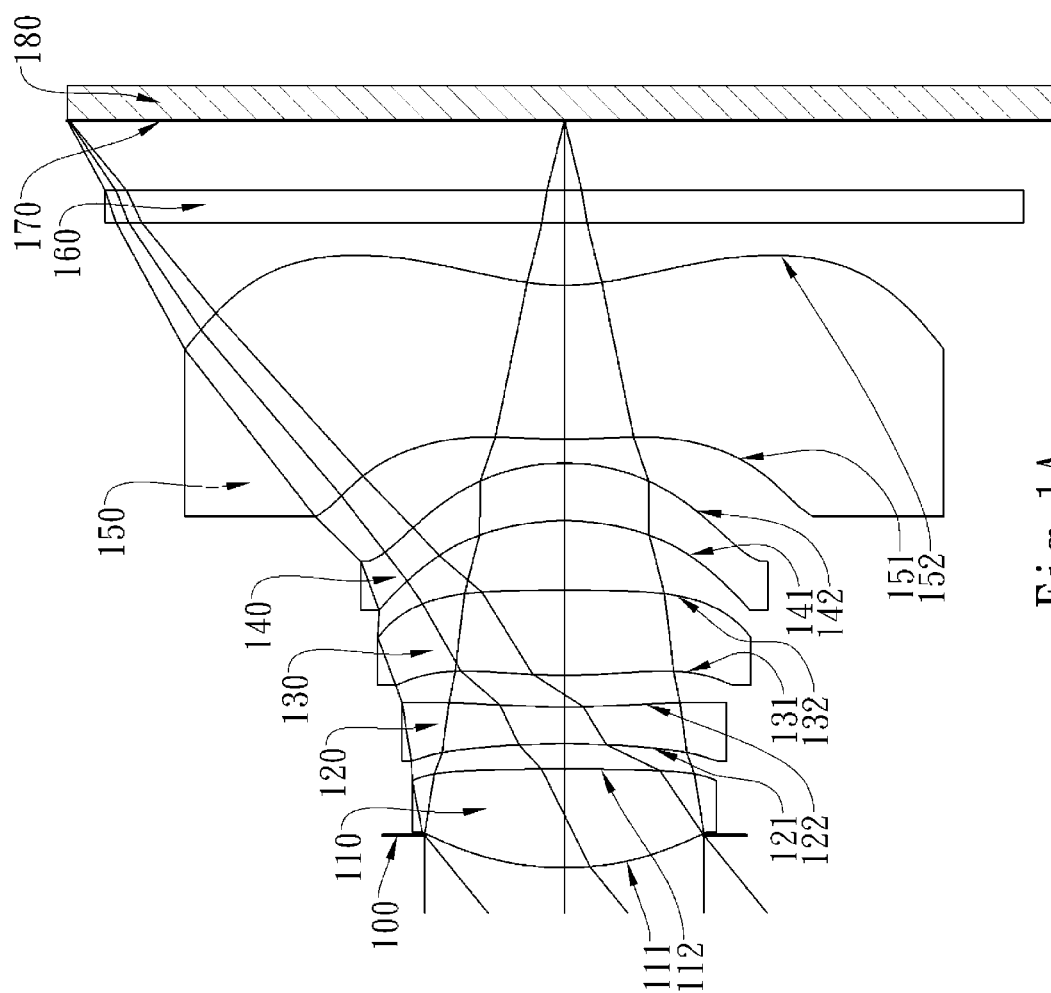
FIG. 1A is a schematic view of an image capturing optical lens system according to the 1st embodiment of the present disclosure.

An image capturing optical lens system includes, in order from an object side to an image side, a first lens element, a second lens element, a third lens element, a fourth lens element and a fifth lens element.

The first lens element has positive refractive power, so that the total track length of the image capturing optical lens system can be reduced. The first lens element has a convex object-side surface, so that it is favorable for further reducing the total track length.

The second lens element has negative refractive power, so that it is favorable for correcting the aberration generated by the first lens element. The second image second lens element has a concave object-side surface, so that it is favorable for further correcting the aberration.

The third lens element can have positive refractive power, so that it is favorable for reducing system sensitivity. The third lens element can have a convex object-side surface, so that it is favorable for further reducing the system sensitivity so as to increase the manufacturing yield rate.

The fourth lens element can have negative refractive power, so that it is favorable for correcting the aberration and reducing the system sensitivity. The fourth lens element can have a concave object-side surface and a convex image-side surface, so that the astigmatism of the image capturing optical lens system can be further corrected.

The fifth lens element with refractive power can have a convex object-side surface and has a concave image-side surface, so that it is favorable for correcting the astigmatism. The fifth lens element has at least one inflection point on the image-side surface, so that it is favorable for reducing the angle at which the incident light projects onto an image sensor from the off-axis so as to increase the responding efficiency of the image sensor and to further correct the aberration of the off-axis.

When a refractive index of the fifth lens element is N5, the following relationship is satisfied: $1.60<N5<1.75$. Therefore, the image side of the image capturing optical lens system can have a larger refractive index which is favorable for obtaining more of the image coverage under limited peripheral regions of the lens elements.

When a focal length of the image capturing optical lens system is f, and a focal length of the fourth lens element is f4, the following relationship is satisfied: $-1.0<f/f4<0.70$. It is favorable for reducing the system sensitivity and correcting the aberration so as to improve image quality. Preferably, the following relationship is further satisfied: $-1.0<f/f4<0.40$.

When a central thickness of the fifth lens element is CT5, and a curvature radius of the object-side surface of the second lens element is R3, the following relationship is satisfied: $-0.60<CT5/R3<-0.05$. Therefore, it is favorable for correcting the aberration and increasing the moldability and homogeneity for plastic lens elements during the injection molding process so as to achieve superior image quality.

When the refractive index of the fifth lens element is N5, and a refractive index of the first lens element is N1, the following relationship is satisfied: $0.06<N5-N1<0.25$. Therefore, it is favorable for the lens elements which are close to the image side of the image capturing optical lens system obtaining larger refractive index so as to acquire more of the image coverage under limited peripheral regions of the lens elements.

When a distance in parallel with an optical axis from an axial vertex on the object-side surface of the fourth lens element to a maximum effective diameter position on the image-side surface of the fourth lens element is $\Delta$ (When the distance towards the image side of the image capturing optical lens system is positive; when the distance towards the object side of the image capturing optical lens system is negative.), and a central thickness of the fourth lens element is CT4, the following relationship is satisfied: $-2.0<\Delta/CT4<-0.20$. Therefore, the fourth lens element will not be excessively curved which is favorable for manufacturing and shaping the lens elements so as to reduce the required space for assembling the lens elements to keep the image capturing optical lens system compact.

When the central thickness of the fourth lens element is CT4, and the central thickness of the fifth lens element is CT5, the following relationship is satisfied: $0.20<CT4/CT5<0.65$. Therefore, it is favorable for arranging the thickness of the lens elements and for providing favorable moldability and homogeneity for plastic lens elements during the injection molding process.

When a vertical distance between a non-axial critical point on the image-side surface of the fifth lens element and the optical axis is Yc52, wherein the non-axial critical point refers to this critical point is not on the optical axis, and the focal length of the image capturing optical lens system is f, the following relationship is satisfied: 0.1<Yc52/f<0.7. It is favorable for correcting the aberration of the off-axis region.

When a vertical distance between a maximum effective diameter position on the image-side surface of the fifth lens element and the optical axis is SD52, and a maximum image height of the image capturing optical lens system is ImgH (half of a diagonal length of an effective photosensitive area of an image sensor), the following relationship is satisfied: 0.60<SD52/ImgH<0.77. Therefore, it is favorable for manufacturing and shaping the lens elements and keeping the image capturing optical lens system compact.

When at least three lens elements with refractive power have refractive index larger than 1.60, it is favorable for balancing the arrangement of the refractive index of the image capturing optical lens system and obtaining more of the image coverage under limited peripheral regions of lens elements.

When a curvature radius of the image-side surface of the fifth lens element is R10, and a curvature radius of the object-side surface of the fifth lens element is R9, the following relationship is satisfied: −0.20<R10/R9<0.90. Therefore, it is favorable for correcting the astigmatism so as to improve the image quality and resolving power.

When an Abbe number of the fourth lens element is V4, an Abbe number of the fifth lens element is V5, and an Abbe number of the first lens element is V1, the following relationship is satisfied: 0.7<(V4+V5)/V1<1.0. Therefore, it is favorable for correcting the chromatic aberration of the image capturing optical lens system.

According to the image capturing optical lens system of the present disclosure, the lens elements thereof can be made of plastic or glass material. When the lens elements are made of glass material, the distribution of the refractive power of the image capturing optical lens system may be more flexible to design. When the lens elements are made of plastic material, the manufacturing costs can be effectively reduced. Furthermore, the surfaces of each lens element can be aspheric, so that it is easier to make the surface into non-spherical shapes. As a result, more controllable variables are obtained, and the aberration is reduced, as well as the number of required lens elements can be reduced while constructing an optical lens system. Therefore, the total track length of the image capturing optical lens system can also be reduced.

According to the image capturing optical lens system of the present disclosure, there can be at least one stop provided, such as an aperture stop, a glare stop or a field stop. Said glare stop or said field stop is for eliminating the stray light and thereby improving the image resolution thereof. In the present image capturing optical lens system, an aperture stop can be configured as a front stop or a middle stop. A front stop can provide a longer distance between an exit pupil of the system and an image plane and which improves the image-sensing efficiency of an image sensor. A middle stop is favorable for enlarging the field of view of the system and thereby provides a wider field of view for the same.

According to the image capturing optical lens system of the present disclosure, each of an object-side surface and an image-side surface of every lens element has a paraxial region and a peripheral region. The paraxial region refers to the region of the surface where light rays travel close to an optical axis and the peripheral region refers to the region of the surface where light rays travel away from the optical axis. Particularly, when a lens element has a convex surface, it indicates that the surface is convex at the paraxial region and when the lens element has a concave surface, it indicates that the surface is concave at the paraxial region.

Figure 9:
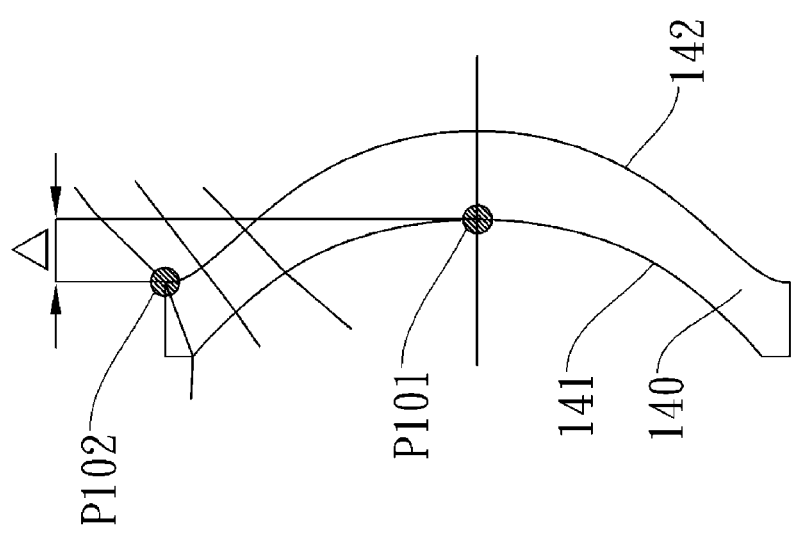
FIG. 9 shows $\Delta$ of the image capturing optical lens system according to the fourth lens element of the 1st embodiment of the present disclosure.

FIG. 9 shows a distance in parallel with the optical axis from an axial vertex P101 on the object-side surface 141 of the fourth lens element 140 to a maximum effective diameter position P102 on the image-side surface 142 of the fourth lens element 140 is Δ. When the distance towards the image side of the image capturing optical lens system is positive; when the distance towards the object side of the image capturing optical lens system is negative.

Figure 10:
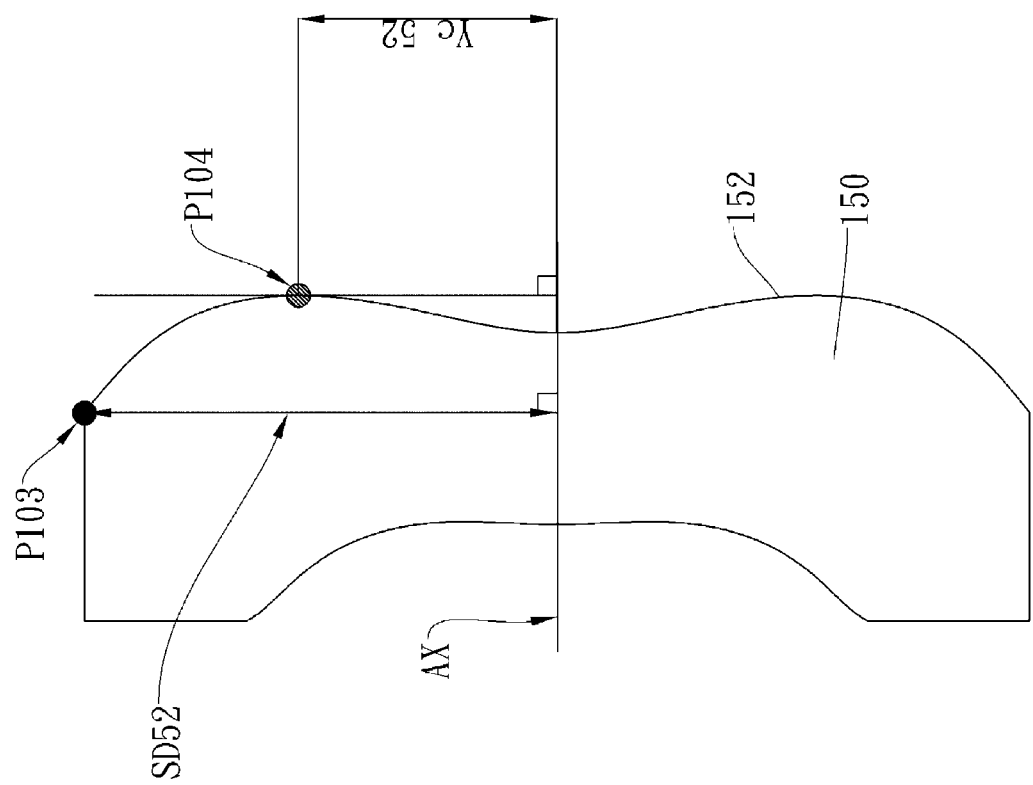
FIG. 10 shows SD52 and Yc52 of the image capturing optical lens system according to the fifth lens element of the 1st embodiment.

Critical point is a non-axial point of the lens surface where its tangent is perpendicular to the optical axis. FIG. 10 shows a vertical distance between a non-axial critical point P104 on the image-side surface 152 of the fifth lens element 150 and the optical axis AX is Yc52. Most important of all, the critical point P104 is not on the optical axis AX. In addition, a vertical distance between a maximum effective diameter position P103 on the image-side surface 152 of the fifth lens element 150 and the optical axis AX is SD52.

According to the image capturing optical lens system of the present disclosure, the image capturing optical lens system is featured with good correction ability and high image quality, and can be applied to 3D (three-dimensional) image capturing applications, in products such as digital cameras, mobile devices and tablets.

According to the above description of the present disclosure, the following 1st-8th specific embodiments are provided for further explanation.

1st Embodiment

Figure 1B:
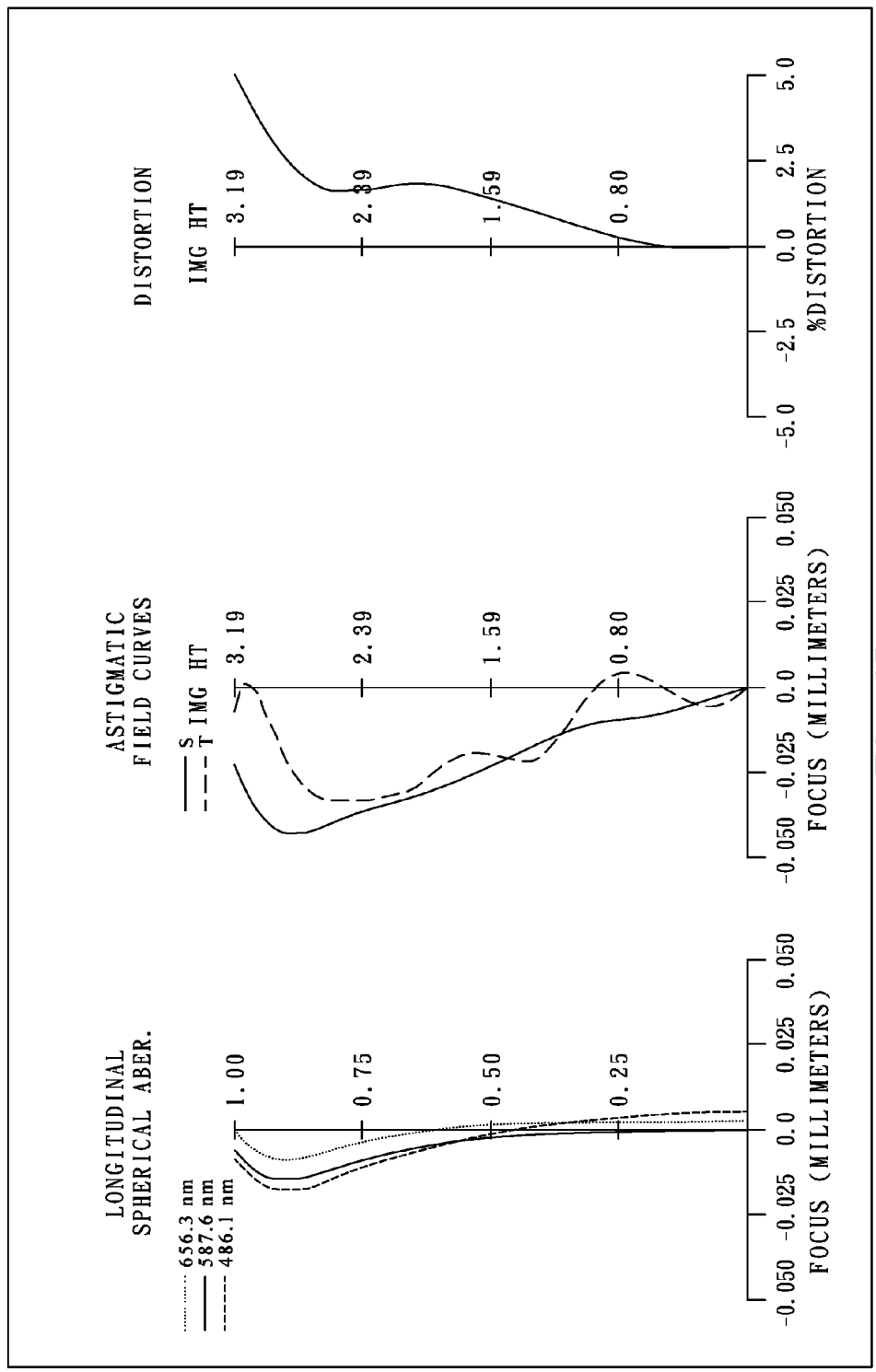
FIG. 1B shows spherical aberration curves, astigmatic field curves and a distortion curve of the image capturing optical lens system according to the 1st embodiment.

FIG. 1A is a schematic view of an image capturing optical lens system according to the 1st embodiment of the present disclosure. FIG. 1B shows spherical aberration curves, astigmatic field curves and a distortion curve of the image capturing optical lens system according to the 1st embodiment. In FIG. 1A, the image capturing optical lens system includes five lens elements with refractive power, in order from an object side to an image side, an aperture stop 100, a first lens element 110, a second lens element 120, a third lens element 130, a fourth lens element 140, a fifth lens element 150, an IR-cut filter 160, an image plane 170, and an image sensor 180.

The first lens element 110 with positive refractive power has a convex object-side surface 111 and a convex image-side surface 112. The first lens element 110 is made of plastic material and has the object-side surface 111 and the image-side surface 112 being aspheric.

The second lens element 120 with negative refractive power has a concave object-side surface 121 and a concave image-side surface 122. The second lens element 120 is made of plastic material and has the object-side surface 121 and the image-side surface 122 being aspheric.

The third lens element 130 with positive refractive power has a convex object-side surface 131 and a convex image-side surface 132. The third lens element 130 is made of plastic material and has the object-side surface 131 and the image-side surface 132 being aspheric.

The fourth lens element 140 with positive refractive power has a concave object-side surface 141 and a convex image-side surface 142. The fourth lens element 140 is made of plastic material and has the object-side surface 141 and the image-side surface 142 being aspheric.

The fifth lens element 150 with negative refractive power has a convex object-side surface 151 and a concave image-side surface 152. The fifth lens element 150 is made of plastic material and has the object-side surface 151 and the image-side surface 152 being aspheric. Furthermore, the fifth lens element 150 has at least one inflection point on the image-side surface 152 thereof.

The refractive index of the second lens element 120, the fourth lens element 140 and the fifth lens element 150 are all larger than 1.6. Furthermore, the IR-cut filter 160 made of glass material is located between the fifth lens element 150 and the image plane 170, and will not affect a focal length of the image capturing optical lens system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

wherein,

X is the relative distance between a point on the aspheric surface spaced at a distance Y from the optical axis and the tangential plane at the aspheric surface vertex on the optical axis;

Y is the distance from the point on the curve of the aspheric surface to the optical axis;

R is the curvature radius;

k is the conic coefficient; and

Ai is the i-th aspheric coefficient.

In the image capturing optical lens system according to the 1st embodiment, when a focal length of the image capturing optical lens system is f, an f-number of the image capturing optical lens system is Fno, and half of the maximal field of view of the image capturing optical lens system is HFOV, these parameters have the following values:

$f$=3.73mm;

$Fno$=2.08; and $HFOV$=39.1degrees.

In the image capturing optical lens system according to the 1st embodiment, when a refractive index of the fifth lens element 150 is N5, the following relationship is satisfied: N5=1.640.

In the image capturing optical lens system according to the 1st embodiment, when the refractive index of the fifth lens element 150 is N5, and a refractive index of the first lens element 110 is N1, the following relationship is satisfied: N5−N1=0.096.

In the image capturing optical lens system according to the 1st embodiment, when an Abbe number of the fourth lens element 140 is V4, an Abbe number of the fifth lens element 150 is V5, and an Abbe number of the first lens element 110 is V1, the following relationship is satisfied: (V4+V5)/V1=0.87.

In the image capturing optical lens system according to the 1st embodiment, when a central thickness of the fourth lens element 140 is CT4, and a central thickness of the fifth lens element 150 is CT5, the following relationship is satisfied: CT4/CT5=0.37.

In the image capturing optical lens system according to the 1st embodiment, when the central thickness of the fifth lens element 150 is CT5, and a curvature radius of the object-side surface 121 of the second lens element 120 is R3, the following relationship is satisfied: CT5/R3=−0.14.

In the image capturing optical lens system according to the 1st embodiment, when a curvature radius of the image-side surface 152 of the fifth lens element 150 is R10, and a curvature radius of the object-side surface 151 of the fifth lens element 150 is R9, the following relationship is satisfied: R10/R9=0.40.

In the image capturing optical lens system according to the 1st embodiment, when the focal length of the image capturing optical lens system is f, and a focal length of the fourth lens element 140 is f4, the following relationship is satisfied: f/f4=0.38.

In the image capturing optical lens system according to the 1st embodiment, when a distance in parallel with the optical axis from an axial vertex P101 (FIG. 9) on the object-side surface 141 of the fourth lens element 140 to a maximum effective diameter position P102 (FIG. 9) on the image-side surface 142 of the fourth lens element 140 is Δ, and the central thickness of the fourth lens element 140 is CT4, the following relationship is satisfied: Δ/CT4=−0.71.

In the image capturing optical lens system according to the 1st embodiment, when a vertical distance between a non-axial critical point P104 (FIG. 10) on the image-side surface 152 of the fifth lens element 150 and the optical axis AX is Yc52, wherein the critical point P104 is not on the optical axis AX (FIG. 10), and the focal length of the image capturing optical lens system is f, the following relationship is satisfied: Yc52/f=0.36.

In the image capturing optical lens system according to the 1st embodiment, when a vertical distance between a maximum effective diameter position P103 (FIG. 10) on the image-side surface 152 of the fifth lens element 150 and the optical axis AX (FIG. 10) is SD52, and a maximum image height of the image capturing optical lens system is ImgH, the following relationship is satisfied: SD52/ImgH=0.766.

The detailed optical data of the 1st embodiment are shown in Table 1, and the aspheric surface data are shown in Table 2 below.

TABLE 1

1st Embodiment
f = 3.73 mm, Fno = 2.08, HFOV = 39.1 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.210 | | | | |
| 2 | Lens 1 | 1.844 | (ASP) | 0.635 | Plastic | 1.544 | 55.9 | 3.18 |
| 3 | | −24.259 | (ASP) | 0.161 | | | | |
| 4 | Lens 2 | −6.882 | (ASP) | 0.240 | Plastic | 1.650 | 21.4 | −4.75 |
| 5 | | 5.667 | (ASP) | 0.203 | | | | |
| 6 | Lens 3 | 3.807 | (ASP) | 0.547 | Plastic | 1.535 | 55.7 | 6.13 |
| 7 | | −22.564 | (ASP) | 0.447 | | | | |
| 8 | Lens 4 | −1.578 | (ASP) | 0.371 | Plastic | 1.614 | 25.6 | 9.86 |
| 9 | | −1.364 | (ASP) | 0.154 | | | | |

TABLE 1-continued

1st Embodiment
f = 3.73 mm, Fno = 2.08, HFOV = 39.1 deg.

| Surface # | | Curvature Radius | | Thickness | Material | Index | Abbe # | Focal length |
|---|---|---|---|---|---|---|---|---|
| 10 | Lens 5 | 3.834 | (ASP) | 0.990 | Plastic | 1.640 | 23.3 | −4.72 |
| 11 | | 1.519 | (ASP) | 0.400 | | | | |
| 12 | IR-cut filter | Plano | | 0.210 | Glass | 1.517 | 64.2 | — |
| 13 | | Plano | | 0.448 | | | | |
| 14 | Image | Plano | | — | | | | |

Note:
Reference wavelength (d-line) is 587.6 nm.

TABLE 2

Aspheric Coefficients

| Surface # | 2 | 3 | 4 | 5 | 6 |
|---|---|---|---|---|---|
| k = | −6.4121E+00 | −9.0000E+01 | −9.1845E+00 | 1.5146E+01 | −5.8887E+01 |
| A4 = | 1.2093E−01 | −1.3185E−02 | −6.5661E−02 | −1.7547E−01 | −5.8649E−02 |
| A6 = | −8.4032E−02 | 2.1920E−02 | 2.2160E−01 | 3.6264E−01 | −1.0726E−01 |
| A8 = | 1.0925E−01 | −7.7627E−02 | −4.3882E−01 | −6.1553E−01 | 1.5177E−01 |
| A10 = | −1.8041E−01 | 6.6639E−02 | 4.8761E−01 | 6.2209E−01 | −1.7670E−01 |
| A12 = | 1.7662E−01 | −1.3382E−01 | −4.5115E−01 | −4.0012E−01 | 7.7825E−02 |
| A14 = | −8.4454E−02 | 7.0479E−02 | 2.0069E−01 | 1.2886E−01 | |

| Surface # | 7 | 8 | 9 | 10 | 11 |
|---|---|---|---|---|---|
| k = | 2.0000E+01 | −1.7605E+01 | −8.8958E+00 | −1.3912E+00 | −7.9626E+00 |
| A4 = | −5.2885E−02 | −3.9298E−01 | −5.1236E−01 | −3.8394E−01 | −7.2477E−02 |
| A6 = | −9.1217E−02 | 7.3642E−01 | 8.1986E−01 | 4.1315E−01 | 2.6529E−02 |
| A8 = | 6.6376E−02 | −1.5232E+00 | −1.1583E+00 | −4.6517E−01 | −8.5693E−03 |
| A10 = | −2.9937E−02 | 1.6491E+00 | 9.6605E−01 | 3.8632E−01 | 1.9673E−03 |
| A12 = | 8.1273E−04 | −8.4285E−01 | −3.9797E−01 | −1.9843E−01 | −3.3717E−04 |
| A14 = | | 1.6342E−01 | 6.5946E−02 | 5.3782E−02 | 3.4763E−05 |
| A16 = | | | | −5.7670E−03 | −1.4739E−06 |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 2A:
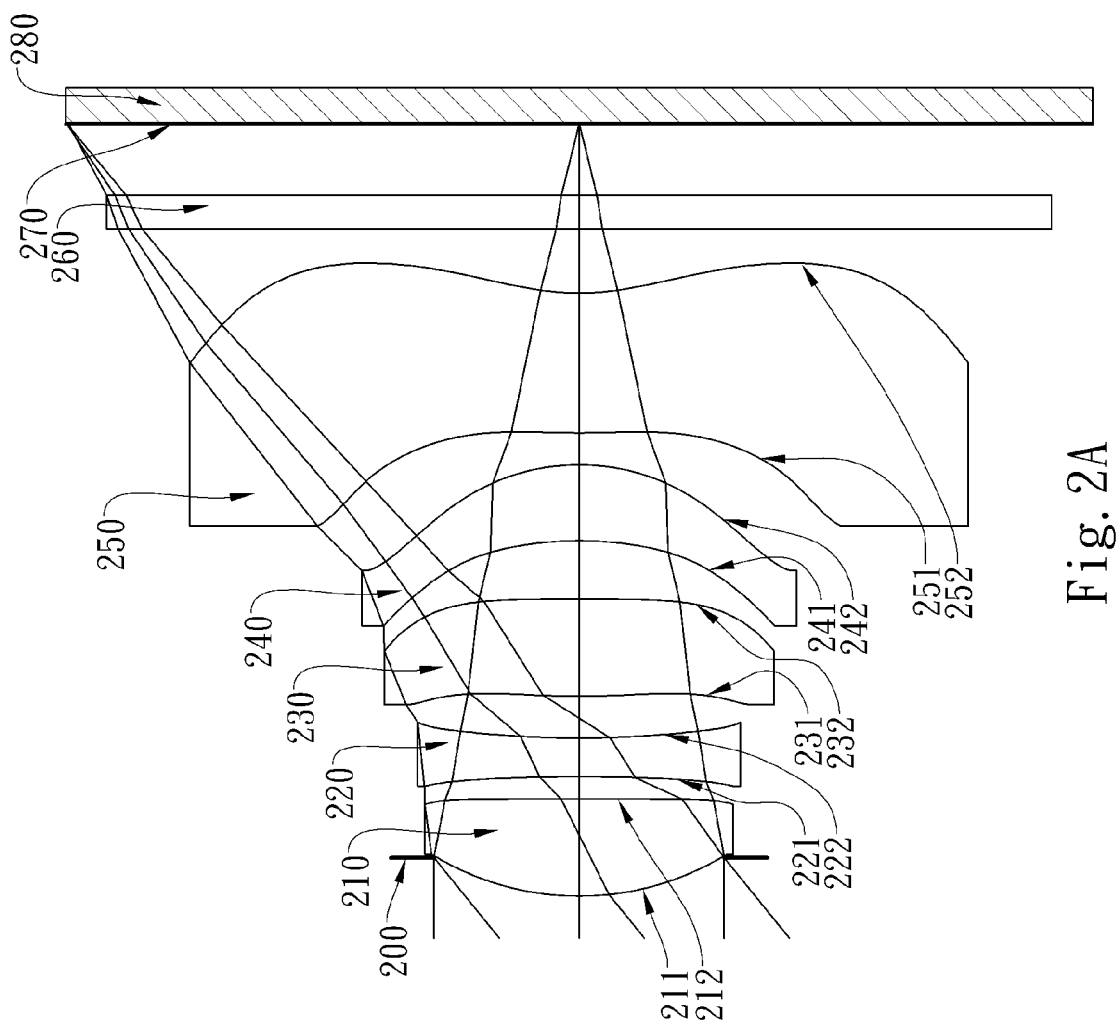
FIG. 2A is a schematic view of an image capturing optical lens system according to the 2nd embodiment of the present disclosure.
Figure 2B:
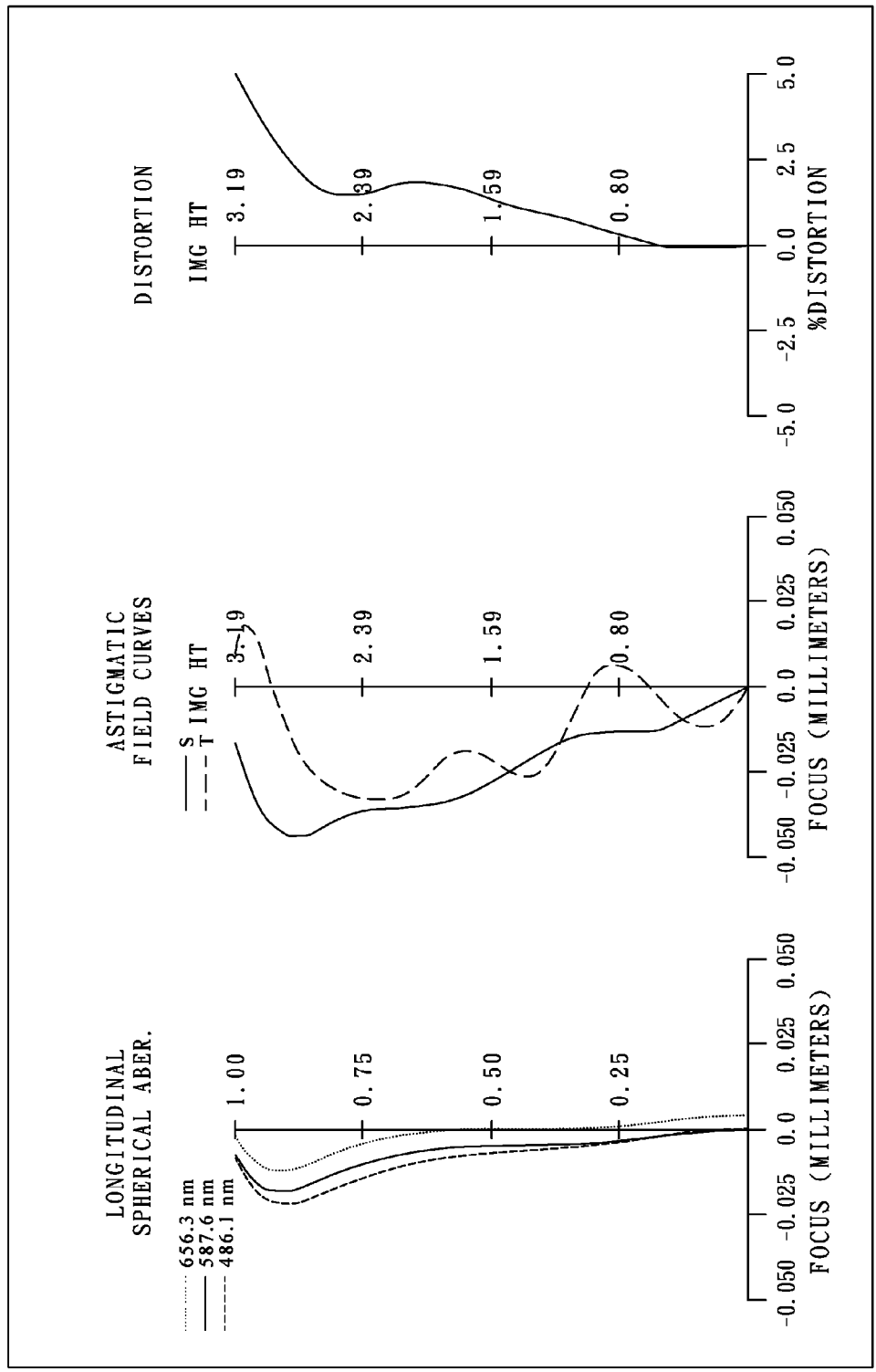
FIG. 2B shows spherical aberration curves, astigmatic field curves and a distortion curve of the image capturing optical lens system according to the 2nd embodiment.

FIG. 2A is a schematic view of an image capturing optical lens system according to the 2nd embodiment of the present disclosure. FIG. 2B shows spherical aberration curves, astigmatic field curves and a distortion curve of the image capturing optical lens system according to the 2nd embodiment. In FIG. 2A, the image capturing optical lens system includes five lens elements with refractive power, in order from an object side to an image side, an aperture stop 200, a first lens element 210, a second lens element 220, a third lens element 230, a fourth lens element 240, a fifth lens element 250, an IR-cut filter 260, an image plane 270, and an image sensor 280.

The first lens element 210 with positive refractive power has a convex object-side surface 211 and a convex image-side surface 212. The first lens element 210 is made of plastic material and has the object-side surface 211 and the image-side surface 212 being aspheric.

The second lens element 220 with negative refractive power has a concave object-side surface 221 and a concave image-side surface 222. The second lens element 220 is made of plastic material and has the object-side surface 221 and the image-side surface 222 being aspheric.

The third lens element 230 with positive refractive power has a convex object-side surface 231 and a convex image-side surface 232. The third lens element 230 is made of plastic material and has the object-side surface 231 and the image-side surface 232 being aspheric.

The fourth lens element 240 with positive refractive power has a concave object-side surface 241 and a convex image-side surface 242. The fourth lens element 240 is made of plastic material and has the object-side surface 241 and the image-side surface 242 being aspheric.

The fifth lens element 250 with negative refractive power has a convex object-side surface 251 and a concave image-side surface 252. The fifth lens element 250 is made of plastic material and has the object-side surface 251 and the image-side surface 252 being aspheric. Furthermore, the fifth lens element 250 has at least one inflection point on the image-side surface 252 thereof.

The IR-cut filter 260 made of glass material is located between the fifth lens element 250 and the image plane 270, and will not affect a focal length of the image capturing optical lens system.

The detailed optical data of the 2nd embodiment are shown in Table 3, and the aspheric surface data are shown in Table 4 below.

TABLE 3

2nd Embodiment
f = 3.75 mm, Fno = 2.08, HFOV = 39.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.238 | | | | |
| 2 | Lens 1 | 1.748 | (ASP) | 0.604 | Plastic | 1.544 | 55.9 | 3.20 |
| 3 | | −317.089 | (ASP) | 0.138 | | | | |
| 4 | Lens 2 | −15.320 | (ASP) | 0.240 | Plastic | 1.650 | 21.4 | −5.53 |
| 5 | | 4.717 | (ASP) | 0.262 | | | | |
| 6 | Lens 3 | 5.074 | (ASP) | 0.603 | Plastic | 1.535 | 55.7 | 9.18 |
| 7 | | −147.096 | (ASP) | 0.364 | | | | |
| 8 | Lens 4 | −2.227 | (ASP) | 0.472 | Plastic | 1.583 | 30.2 | 5.08 |
| 9 | | −1.372 | (ASP) | 0.199 | | | | |
| 10 | Lens 5 | 5.464 | (ASP) | 0.870 | Plastic | 1.640 | 23.3 | −3.37 |
| 11 | | 1.450 | (ASP) | 0.400 | | | | |
| 12 | IR-cut filter | Plano | | 0.210 | Glass | 1.517 | 64.2 | — |
| 13 | | Plano | | 0.442 | | | | |
| 14 | Image | Plano | | — | | | | |

Note:
Reference wavelength (d-line) is 587.6 nm.

TABLE 4

Aspheric Coefficients

| Surface # | 2 | 3 | 4 | 5 | 6 |
|---|---|---|---|---|---|
| k = | −5.8736E+00 | 2.0000E+01 | 2.0000E+01 | 1.4936E+01 | −9.0000E+01 |
| A4 = | 1.3597E−01 | −1.0285E−02 | −7.5820E−02 | −1.4931E−01 | −7.0856E−02 |
| A6 = | −8.0289E−02 | 4.6200E−02 | 2.5217E−01 | 3.2479E−01 | −8.6337E−02 |
| A8 = | 1.1225E−01 | −8.5551E−02 | −4.6358E−01 | −5.6948E−01 | 1.3212E−01 |
| A10 = | −1.7680E−01 | 5.4664E−02 | 5.0292E−01 | 6.2597E−01 | −1.7947E−01 |
| A12 = | 1.7640E−01 | −1.0162E−01 | −4.1504E−01 | −4.1229E−01 | 9.9593E−02 |
| A14 = | −8.3496E−02 | 4.9100E−02 | 1.6660E−01 | 1.3959E−01 | |

| Surface # | 7 | 8 | 9 | 10 | 11 |
|---|---|---|---|---|---|
| k = | −1.0000E+01 | −4.2943E+01 | −8.9291E+00 | −1.0290E+00 | −8.0846E+00 |
| A4 = | −6.9795E−02 | −3.9339E−01 | −5.0980E−01 | −3.8000E−01 | −8.1561E−02 |
| A6 = | −1.0254E−01 | 7.4355E−01 | 8.2643E−01 | 4.1834E−01 | 3.1509E−02 |
| A8 = | 7.3168E−02 | −1.5370E+00 | −1.1566E+00 | −4.6371E−01 | −9.3893E−03 |
| A10 = | −3.6940E−02 | 1.6503E+00 | 9.6455E−01 | 3.8558E−01 | 1.9077E−03 |
| A12 = | 6.8491E−03 | −8.3623E−01 | −3.9963E−01 | −1.9896E−01 | −3.2232E−04 |
| A14 = | | 1.6116E−01 | 6.5588E−02 | 5.3687E−02 | 3.6431E−05 |
| A16 = | | | | −5.6854E−03 | −1.7307E−06 |

In the image capturing optical lens system according to the 2nd embodiment, the definitions of these parameters shown in the following table are the same as those stated in the 1st embodiment with corresponding values for the 2nd embodiment. Moreover, these parameters can be calculated from Table 3 and Table 4 as the following values and satisfy the following relationships:

| f [mm] | 3.75 | CT5/R3 | −0.06 |
|---|---|---|---|
| Fno | 2.08 | R10/R9 | 0.27 |
| HFOV [deg.] | 39.0 | f/f4 | 0.74 |
| N5 | 1.640 | Δ/CT4 | −0.39 |
| N5-N1 | 0.096 | Yc52/f | 0.35 |
| (V4 + V5)/V1 | 0.96 | SD52/ImgH | 0.759 |
| CT4/CT5 | 0.54 | | |

3rd Embodiment

Figure 3A:
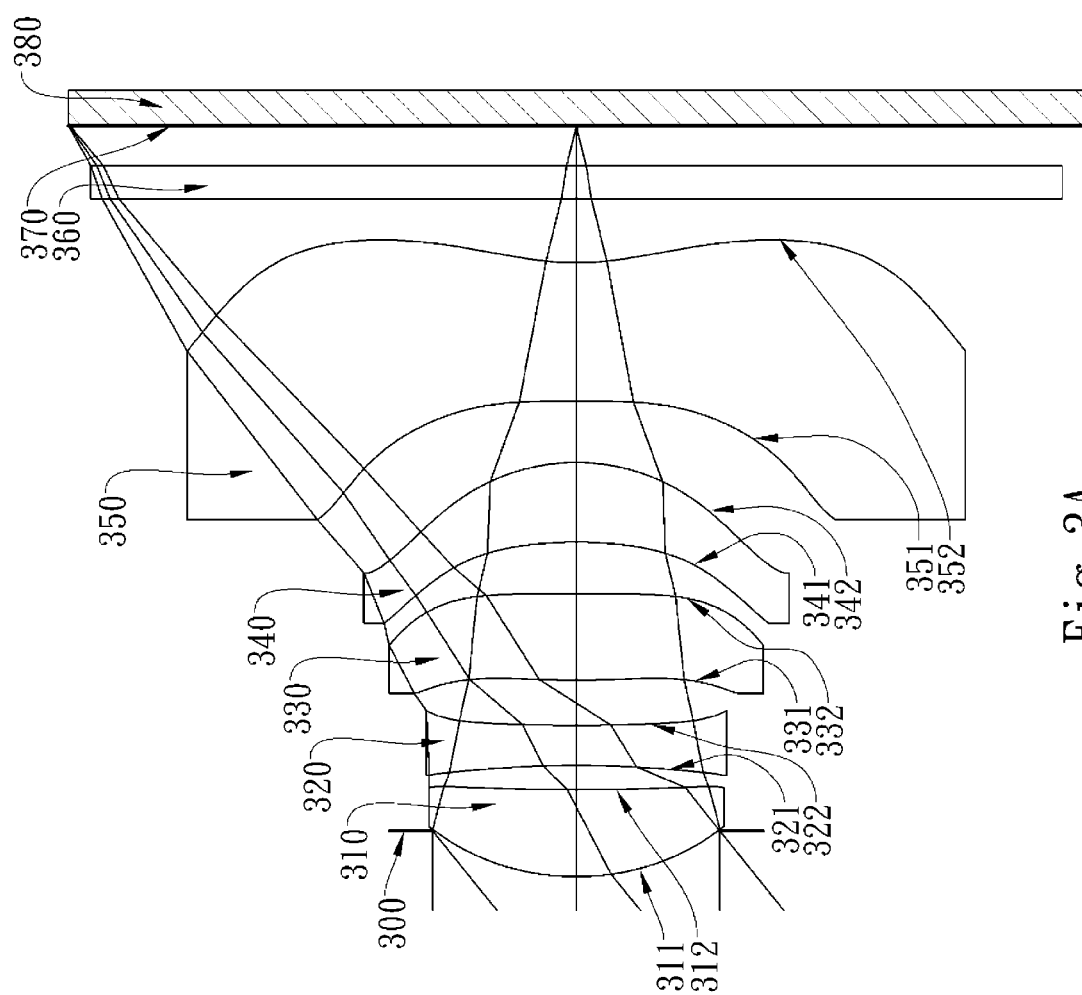
FIG. 3A is a schematic view of an image capturing optical lens system according to the 3rd embodiment of the present disclosure.
Figure 3B:
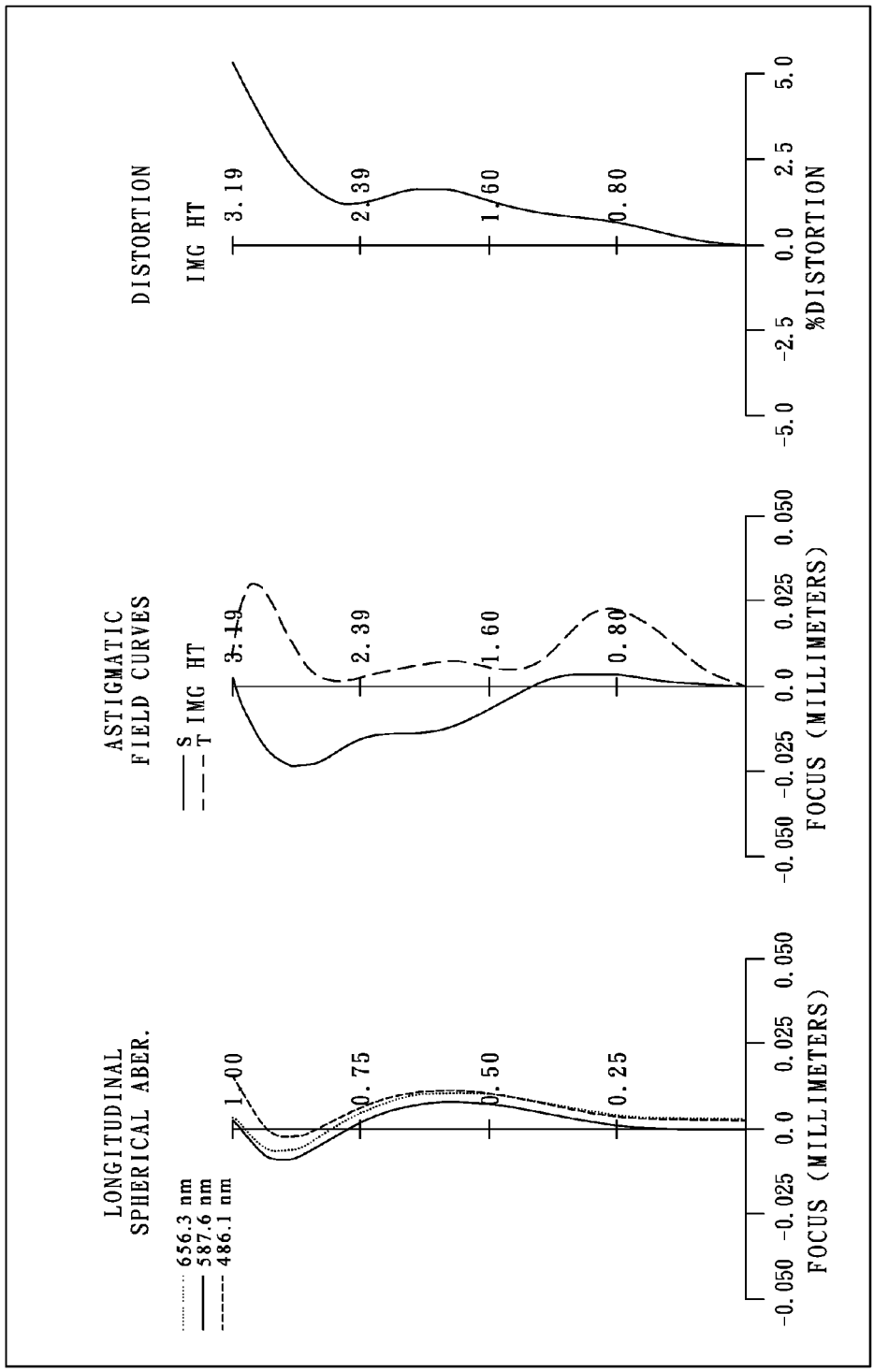
FIG. 3B shows spherical aberration curves, astigmatic field curves and a distortion curve of the image capturing optical lens system according to the 3rd embodiment.

FIG. 3A is a schematic view of an image capturing optical lens system according to the 3rd embodiment of the present disclosure. FIG. 3B shows spherical aberration curves, astigmatic field curves and a distortion curve of the image capturing optical lens system according to the 3rd embodiment. In FIG. 3A, the image capturing optical lens system includes five lens elements with refractive power, in order from an object side to an image side, an aperture stop 300, a first lens element 310, a second lens element 320, a third lens element 330, a fourth lens element 340, a fifth lens element 350, an IR-cut filter 360, an image plane 370, and an image sensor 380.

The first lens element 310 with positive refractive power has a convex object-side surface 311 and a concave image-side surface 312. The first lens element 310 is made of plastic material and has the object-side surface 311 and the image-side surface 312 being aspheric.

The second lens element 320 with negative refractive power has a concave object-side surface 321 and a concave image-side surface 322. The second lens element 320 is made of plastic material and has the object-side surface 321 and the image-side surface 322 being aspheric.

The third lens element 330 with positive refractive power has a convex object-side surface 331 and a concave image-side surface 332. The third lens element 330 is made of plastic material and has the object-side surface 331 and the image-side surface 332 being aspheric.

The fourth lens element 340 with positive refractive power has a concave object-side surface 341 and a convex image-side surface 342. The fourth lens element 340 is made of plastic material and has the object-side surface 341 and the image-side surface 342 being aspheric.

The fifth lens element 350 with negative refractive power has a concave object-side surface 351 and a concave image-side surface 352. The fifth lens element 350 is made of plastic material and has the object-side surface 351 and the image-side surface 352 being aspheric. Furthermore, the fifth lens element 350 has at least one inflection point on the image-side surface 352 thereof.

The IR-cut filter 360 made of glass material is located between the fifth lens element 350 and the image plane 370, and will not affect a focal length of the image capturing optical lens system.

The detailed optical data of the 3rd embodiment are shown in Table 5, and the aspheric surface data are shown in Table 6 below.

embodiment with corresponding values for the 3rd embodiment. Moreover, these parameters can be calculated from Table 5 and Table 6 as the following values and satisfy the following relationships:

| f [mm] | 3.75 | CT5/R3 | −0.11 |
|---|---|---|---|
| Fno | 2.08 | R10/R9 | −0.02 |
| HFOV [deg.] | 38.9 | f/f4 | 0.86 |
| N5 | 1.640 | Δ/CT4 | −0.39 |
| N5-N1 | 0.096 | Yc52/f | 0.33 |
| (V4 + V5)/V1 | 1.43 | SD52/ImgH | 0.768 |
| CT4/CT5 | 0.57 | | |

4th Embodiment

Figure 4A:
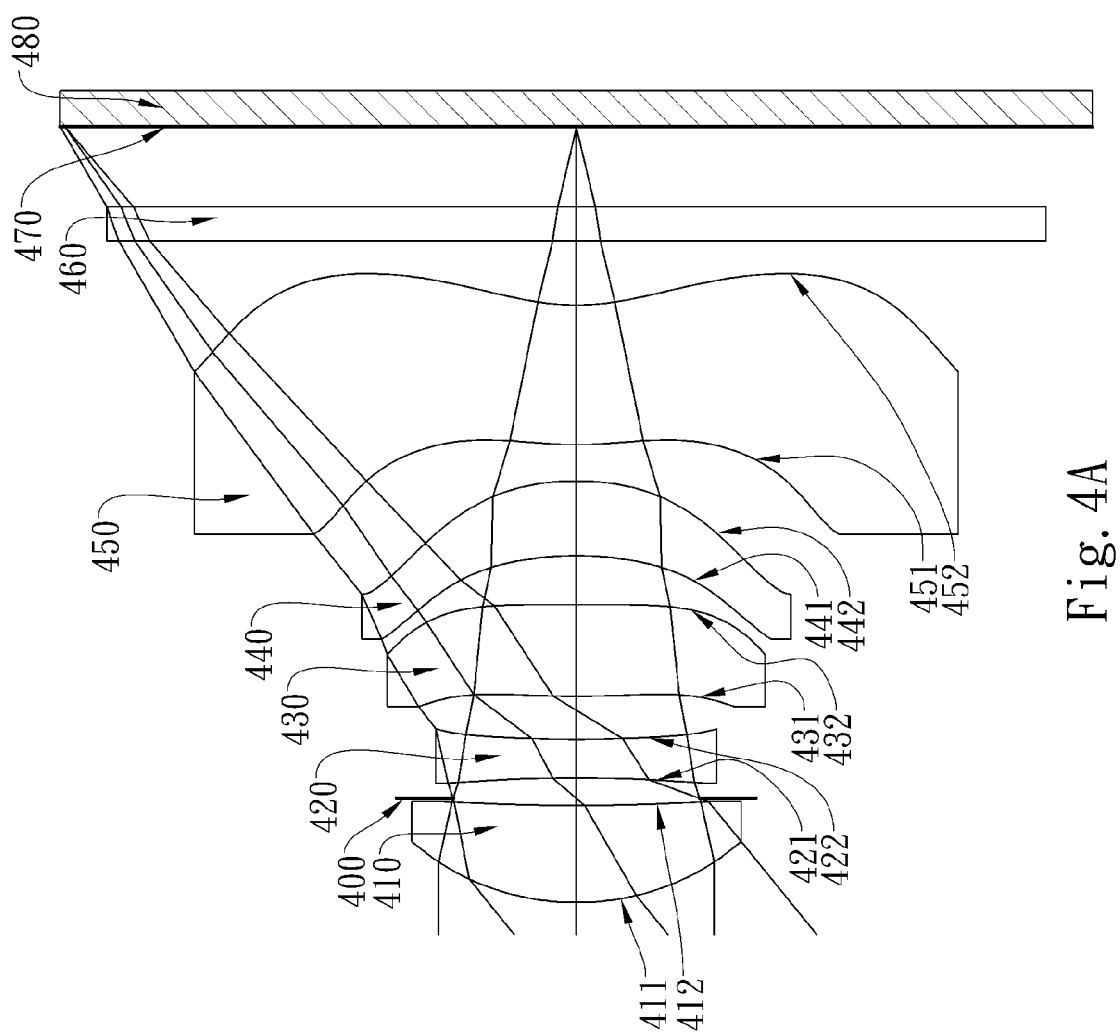
FIG. 4A is a schematic view of an image capturing optical lens system according to the 4th embodiment of the present disclosure.
Figure 4B:
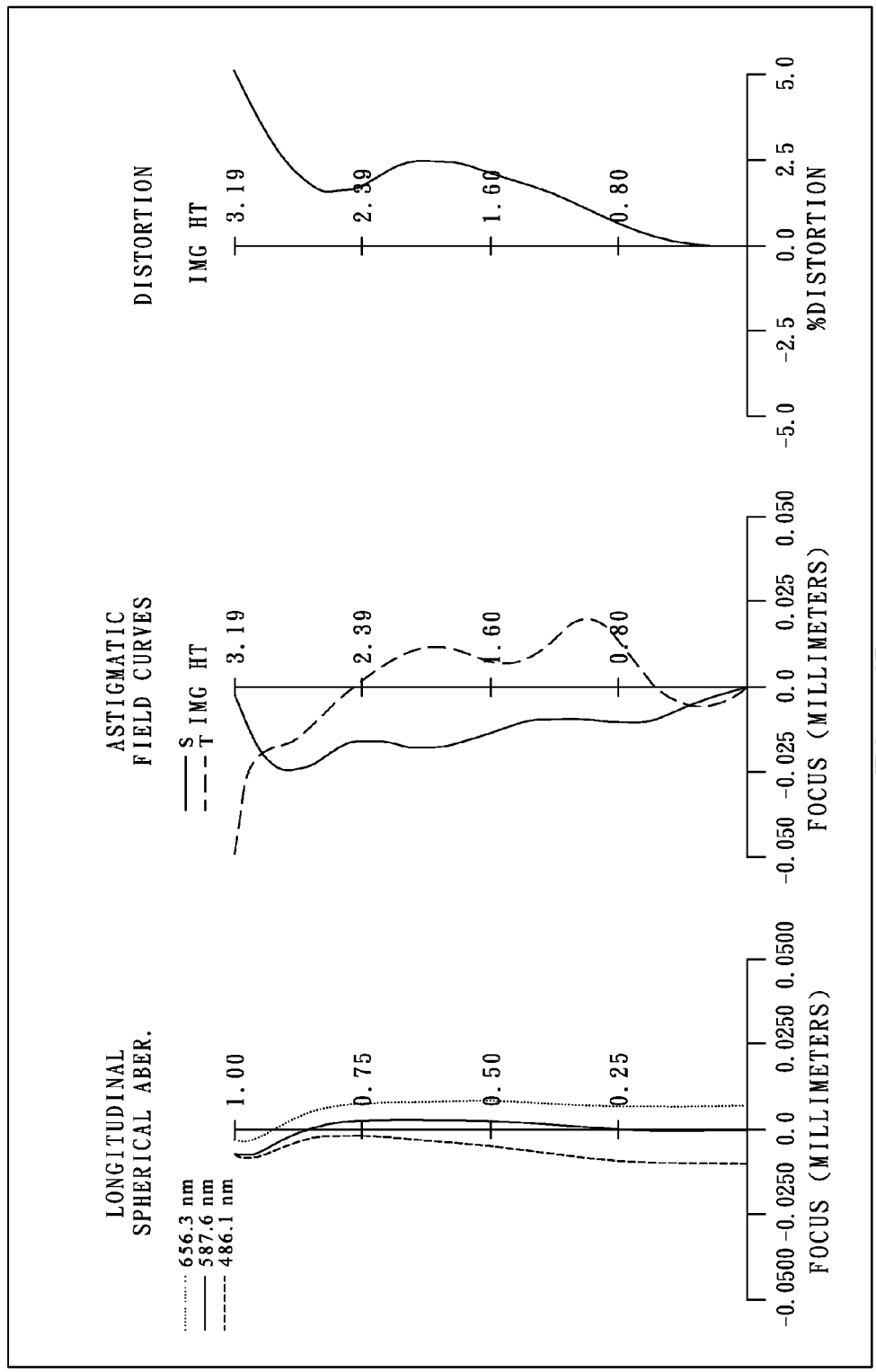
FIG. 4B shows spherical aberration curves, astigmatic field curves and a distortion curve of the image capturing optical lens system according to the 4th embodiment.

FIG. 4A is a schematic view of an image capturing optical lens system according to the 4th embodiment of the present disclosure. FIG. 4B shows spherical aberration curves, astig-

TABLE 5

3rd Embodiment
f = 3.75 mm, Fno = 2.08, HFOV = 38.9 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.286 | | | | |
| 2 | Lens 1 | 1.568 | (ASP) | 0.547 | Plastic | 1.544 | 55.9 | 3.21 |
| 3 | | 13.300 | (ASP) | 0.152 | | | | |
| 4 | Lens 2 | −8.052 | (ASP) | 0.252 | Plastic | 1.650 | 21.4 | −6.28 |
| 5 | | 8.372 | (ASP) | 0.284 | | | | |
| 6 | Lens 3 | 5.366 | (ASP) | 0.542 | Plastic | 1.535 | 55.7 | 11.04 |
| 7 | | 56.550 | (ASP) | 0.326 | | | | |
| 8 | Lens 4 | −2.607 | (ASP) | 0.500 | Plastic | 1.543 | 56.5 | 4.35 |
| 9 | | −1.323 | (ASP) | 0.386 | | | | |
| 10 | Lens 5 | −81.633 | (ASP) | 0.870 | Plastic | 1.640 | 23.3 | −2.61 |
| 11 | | 1.714 | (ASP) | 0.400 | | | | |
| 12 | IR-cut filter | Plano | | 0.210 | Glass | 1.517 | 64.2 | — |
| 13 | | Plano | | 0.249 | | | | |
| 14 | Image | Plano | | — | | | | |

Note:
Reference wavelength (d-line) is 587.6 nm.

TABLE 6

Aspheric Coefficients

| Surface # | 2 | 3 | 4 | 5 | 6 |
|---|---|---|---|---|---|
| k = | −4.4498E+00 | −8.0053E+01 | 1.4186E+01 | −1.3249E+01 | −9.0000E+01 |
| A4 = | 1.5189E−01 | −2.9293E−02 | −1.0477E−01 | −1.2803E−01 | −1.2325E−01 |
| A6 = | −6.9419E−02 | 5.8190E−02 | 3.1204E−01 | 3.8247E−01 | −6.9384E−02 |
| A8 = | 1.1837E−01 | −5.6380E−02 | −4.3039E−01 | −5.0639E−01 | 1.2464E−01 |
| A10 = | −1.7109E−01 | 8.6861E−02 | 5.1047E−01 | 6.0145E−01 | −1.9263E−01 |
| A12 = | 1.8012E−01 | −9.9797E−02 | −4.3661E−01 | −4.4551E−01 | 1.2063E−01 |
| A14 = | −8.2931E−02 | −2.5824E−03 | 1.2770E−01 | 1.7592E−01 | |

| Surface # | 7 | 8 | 9 | 10 | 11 |
|---|---|---|---|---|---|
| k = | −1.0000E+01 | −5.2611E+01 | −8.3778E+00 | −9.0000E+01 | −1.0628E+01 |
| A4 = | −9.4927E−02 | −4.1769E−01 | −5.3403E−01 | −3.5089E−01 | −8.1494E−02 |
| A6 = | −1.1203E−01 | 7.3992E−01 | 8.3408E−01 | 4.1225E−01 | 3.1958E−02 |
| A8 = | 6.9812E−02 | −1.5322E+00 | −1.1581E+00 | −4.6313E−01 | −9.3526E−03 |
| A10 = | −3.2905E−02 | 1.6505E+00 | 9.6414E−01 | 3.8546E−01 | 1.8701E−03 |
| A12 = | 7.1911E−03 | −8.3470E−01 | −3.9921E−01 | −1.9913E−01 | −3.2335E−04 |
| A14 = | | 1.6250E−01 | 6.5909E−02 | 5.3654E−02 | 3.7277E−05 |
| A16 = | | | | −5.6539E−03 | −1.7457E−06 |

In the image capturing optical lens system according to the 3rd embodiment, the definitions of these parameters shown in the following table are the same as those stated in the 1st matic field curves and a distortion curve of the image capturing optical lens system according to the 4th embodiment. In FIG. 4A, the image capturing optical lens system includes five lens elements with refractive power, in order from an object side to an image side, a first lens element 410, an aperture stop 400, a second lens element 420, a third lens element 430, a fourth lens element 440, a fifth lens element 450, an IR-cut filter 460, an image plane 470, and an image sensor 480.

The first lens element 410 with positive refractive power has a convex object-side surface 411 and a concave image-side surface 412. The first lens element 410 is made of plastic material and has the object-side surface 411 and the image-side surface 412 being aspheric.

The second lens element 420 with negative refractive power has a concave object-side surface 421 and a concave image-side surface 422. The second lens element 420 is made of plastic material and has the object-side surface 421 and the image-side surface 422 being aspheric.

The third lens element 430 with positive refractive power has a convex object-side surface 431 and a convex image-side surface 432. The third lens element 430 is made of plastic material and has the object-side surface 431 and the image-side surface 432 being aspheric.

The fourth lens element 440 with positive refractive power has a concave object-side surface 441 and a convex image-side surface 442. The fourth lens element 440 is made of plastic material and has the object-side surface 441 and the image-side surface 442 being aspheric.

The fifth lens element 450 with negative refractive power has a convex object-side surface 451 and a concave image-side surface 452. The fifth lens element 450 is made of plastic material and has the object-side surface 451 and the image-side surface 452 being aspheric. Furthermore, the fifth lens element 450 has at least one inflection point on the image-side surface 452 thereof.

The IR-cut filter 460 made of glass material is located between the fifth lens element 450 and the image plane 470, and will not affect a focal length of the image capturing optical lens system.

The detailed optical data of the 4th embodiment are shown in Table 7, and the aspheric surface data are shown in Table 8 below.

TABLE 7

4th Embodiment
f = 3.74 mm, Fno = 2.20, HFOV = 39.0 deg.

| Surface # |  | Curvature Radius |  | Thickness | Material | Index | Abbe # | Focal length |
|---|---|---|---|---|---|---|---|---|
| 0 | Object | Plano |  | Infinity |  |  |  |  |
| 1 | Lens 1 | 1.614 | (ASP) | 0.605 | Plastic | 1.535 | 55.7 | 3.47 |
| 2 |  | 10.857 | (ASP) | 0.044 |  |  |  |  |
| 3 | Ape. Stop | Plano |  | 0.127 |  |  |  |  |
| 4 | Lens 2 | −14.275 | (ASP) | 0.240 | Plastic | 1.650 | 21.4 | −6.67 |
| 5 |  | 6.265 | (ASP) | 0.269 |  |  |  |  |
| 6 | Lens 3 | 5.478 | (ASP) | 0.572 | Plastic | 1.530 | 55.8 | 10.20 |
| 7 |  | −406.669 | (ASP) | 0.305 |  |  |  |  |
| 8 | Lens 4 | −2.055 | (ASP) | 0.465 | Plastic | 1.543 | 56.5 | 14.91 |
| 9 |  | −1.770 | (ASP) | 0.227 |  |  |  |  |
| 10 | Lens 5 | 2.280 | (ASP) | 0.870 | Plastic | 1.640 | 23.3 | −9.12 |
| 11 |  | 1.395 | (ASP) | 0.400 |  |  |  |  |
| 12 | IR-cut filter | Plano |  | 0.210 | Glass | 1.517 | 64.2 | — |
| 13 |  | Plano |  | 0.501 |  |  |  |  |
| 14 | Image | Plano |  | — |  |  |  |  |

Note:
Reference wavelength (d-line) is 587.6 nm.

TABLE 8

Aspheric Coefficients

| Surface # | 1 | 2 | 4 | 5 | 6 |
|---|---|---|---|---|---|
| k = | −4.9677E+00 | −4.8104E+01 | 2.0000E+01 | −2.0346E+01 | −8.9540E+01 |
| A4 = | 1.5026E−01 | −3.0616E−02 | −1.2228E−01 | −1.3222E−01 | −1.0876E−01 |
| A6 = | −7.2422E−02 | 5.6310E−02 | 3.1166E−01 | 3.7375E−01 | −6.0349E−02 |
| A8 = | 1.1043E−01 | −6.0851E−02 | −4.3364E−01 | −5.0461E−01 | 1.1683E−01 |
| A10 = | −1.7505E−01 | 7.9875E−02 | 5.1222E−01 | 6.0448E−01 | −2.0124E−01 |
| A12 = | 1.8364E−01 | −1.0503E−01 | −4.2812E−01 | −4.4781E−01 | 1.2263E−01 |
| A14 = | −7.7077E−02 | 3.8120E−02 | 1.3929E−01 | 1.6328E−01 |  |

| Surface # | 7 | 8 | 9 | 10 | 11 |
|---|---|---|---|---|---|
| k = | −5.4297E+00 | −3.2859E+01 | −5.8203E+00 | −1.9950E+01 | −7.0161E+00 |
| A4 = | −7.9152E−02 | −4.2058E−01 | −5.3244E−01 | −3.6492E−01 | −8.8152E−02 |
| A6 = | −1.1415E−01 | 7.4065E−01 | 8.3483E−01 | 4.1054E−01 | 3.2690E−02 |
| A8 = | 6.6995E−02 | −1.5285E+00 | −1.1591E+00 | −4.6263E−01 | −9.3802E−03 |
| A10 = | −3.1424E−02 | 1.6528E+00 | 9.6348E−01 | 3.8568E−01 | 1.8571E−03 |
| A12 = | 8.1995E−03 | −8.3412E−01 | −3.9932E−01 | −1.9910E−01 | −3.2388E−04 |
| A14 = |  | 1.6218E−01 | 6.5998E−02 | 5.3640E−02 | 3.7491E−05 |
| A16 = |  |  |  | −5.6618E−03 | −1.6860E−06 |

In the image capturing optical lens system according to the 4th embodiment, the definitions of these parameters shown in the following table are the same as those stated in the 1st embodiment with corresponding values for the 4th embodiment. Moreover, these parameters can be calculated from Table 7 and Table 8 as the following values and satisfy the following relationships:

| f [mm] | 3.74 | CT5/R3 | −0.06 |
|---|---|---|---|
| Fno | 2.20 | R10/R9 | 0.61 |
| HFOV [deg.] | 39.0 | f/f4 | 0.25 |
| N5 | 1.640 | A/CT4 | −0.52 |
| N5-N1 | 0.105 | Yc52/f | 0.35 |
| (V4 + V5)/V1 | 1.43 | SD52/ImgH | 0.746 |
| CT4/CT5 | 0.53 | | |

5th Embodiment

Figure 5A:
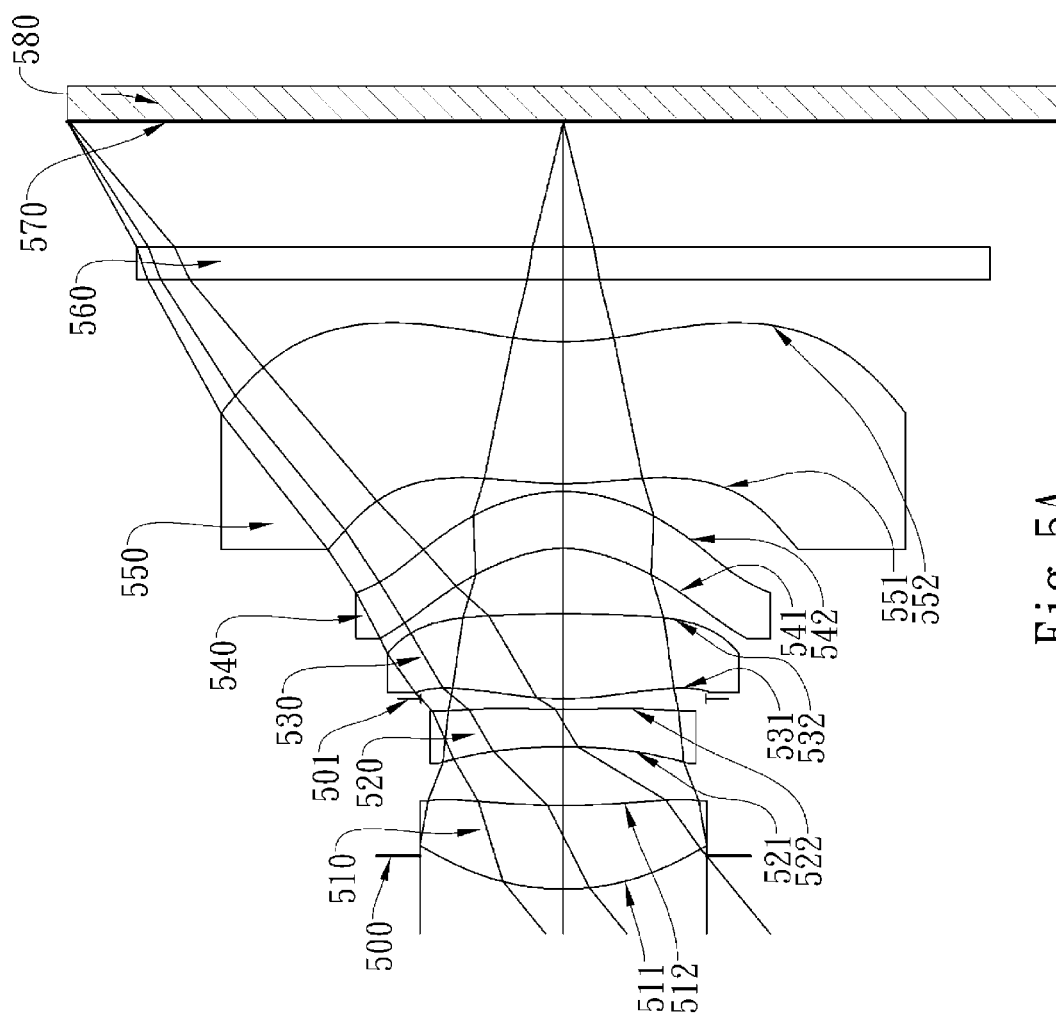
FIG. 5A is a schematic view of an image capturing optical lens system according to the 5th embodiment of the present disclosure.
Figure 5B:
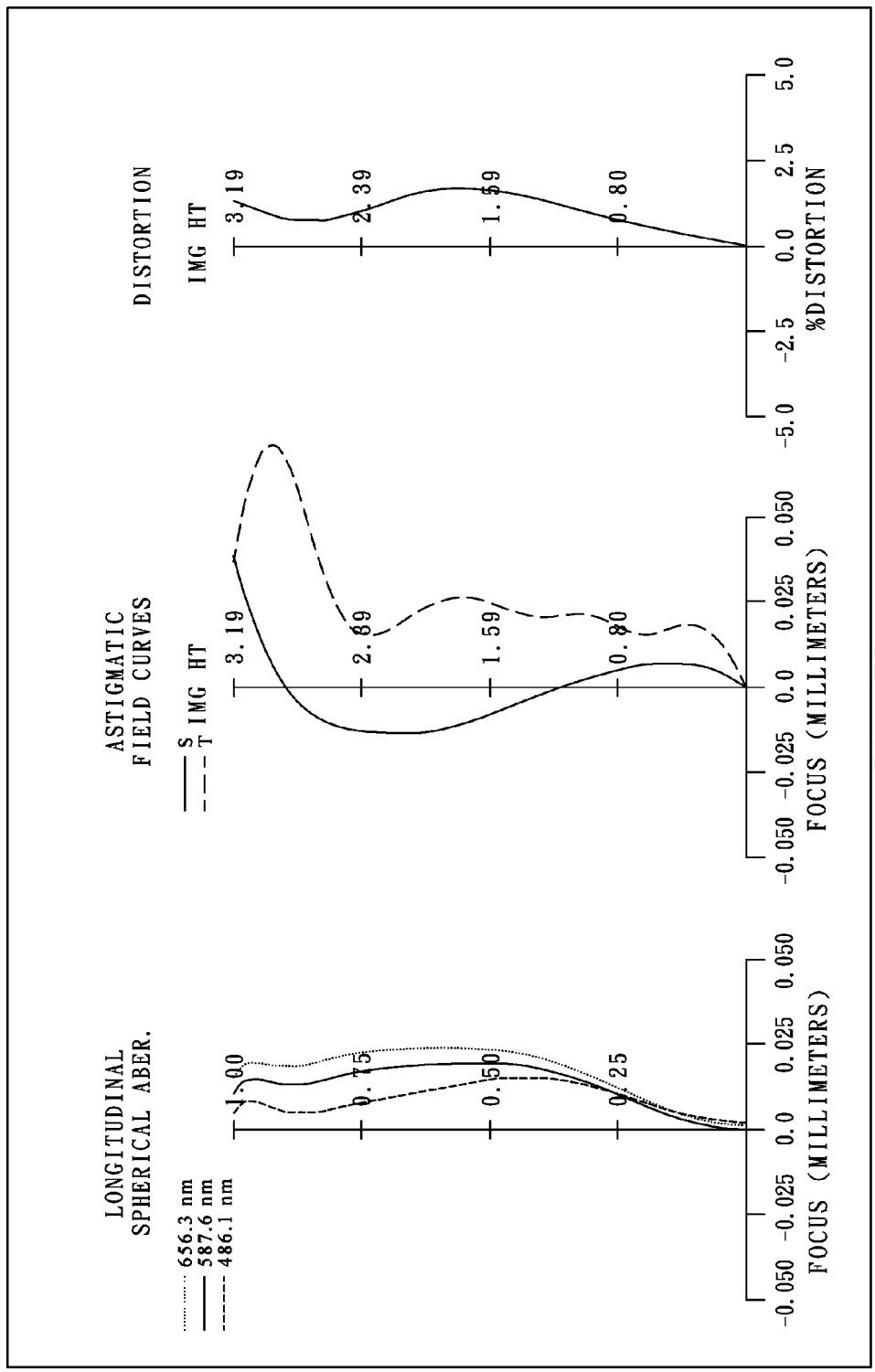
FIG. 5B shows spherical aberration curves, astigmatic field curves and a distortion curve of the image capturing optical lens system according to the 5th embodiment.

FIG. 5A is a schematic view of an image capturing optical lens system according to the 5th embodiment of the present disclosure. FIG. 5B shows spherical aberration curves, astigmatic field curves and a distortion curve of the image capturing optical lens system according to the 5th embodiment. In FIG. 5A, the image capturing optical lens system includes five lens elements with refractive power, in order from an object side to an image side, an aperture stop 500, a first lens element 510, a second lens element 520, a stop 501, a third lens element 530, a fourth lens element 540, a fifth lens element 550, an IR-cut filter 560, an image plane 570, and an image sensor 580.

The first lens element 510 with positive refractive power has a convex object-side surface 511 and a concave image-side surface 512. The first lens element 510 is made of plastic material and has the object-side surface 511 and the image-side surface 512 being aspheric.

The second lens element 520 with negative refractive power has a concave object-side surface 521 and a concave image-side surface 522. The second lens element 520 is made of plastic material and has the object-side surface 521 and the image-side surface 522 being aspheric.

The third lens element 530 with positive refractive power has a convex object-side surface 531 and a convex image-side surface 532. The third lens element 530 is made of plastic material and has the object-side surface 531 and the image-side surface 532 being aspheric.

The fourth lens element 540 with negative refractive power has a concave object-side surface 541 and a convex image-side surface 542. The fourth lens element 540 is made of plastic material and has the object-side surface 541 and the image-side surface 542 being aspheric.

The fifth lens element 550 with positive refractive power has a convex object-side surface 551 and a concave image-side surface 552. The fifth lens element 550 is made of plastic material and has the object-side surface 551 and the image-side surface 552 being aspheric. Furthermore, the fifth lens element 550 has at least one inflection point on the image-side surface 552 thereof.

The refractive index of the second lens element 520, the fourth lens element 540 and the fifth lens element 550 are all larger than 1.6. Furthermore, the IR-cut filter 560 made of glass material is located between the fifth lens element 550 and the image plane 570, and will not affect a focal length of the image capturing optical lens system.

The detailed optical data of the 5th embodiment are shown in Table 9, and the aspheric surface data are shown in Table 10 below.

TABLE 9

5th Embodiment
f = 3.83 mm, Fno = 2.08, HFOV = 39.3 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.213 | | | | |
| 2 | Lens 1 | 1.578 | (ASP) | 0.539 | Plastic | 1.544 | 55.9 | 4.00 |
| 3 | | 5.054 | (ASP) | 0.376 | | | | |
| 4 | Lens 2 | −4.208 | (ASP) | 0.240 | Plastic | 1.634 | 23.8 | −3.65 |
| 5 | | 5.243 | (ASP) | 0.070 | | | | |
| 6 | stop | Plano | | 0.000 | | | | |
| 7 | Lens 3 | 1.883 | (ASP) | 0.547 | Plastic | 1.544 | 55.9 | 2.77 |
| 8 | | −6.741 | (ASP) | 0.419 | | | | |
| 9 | Lens 4 | −0.765 | (ASP) | 0.367 | Plastic | 1.634 | 23.8 | −10.53 |
| 10 | | −1.025 | (ASP) | 0.050 | | | | |
| 11 | Lens 5 | 2.227 | (ASP) | 0.914 | Plastic | 1.634 | 23.8 | 1563.63 |
| 12 | | 1.877 | (ASP) | 0.400 | | | | |
| 13 | IR-cut filter | Plano | | 0.210 | Glass | 1.517 | 64.2 | — |
| 14 | | Plano | | 0.808 | | | | |
| 15 | Image | Plano | | — | | | | |

Note:
Reference wavelength (d-line) is 587.6 nm.
Half of the diameter of the stop at Surface 6 is 0.915 mm.

TABLE 10

Aspheric Coefficients

| Surface # | 2 | 3 | 4 | 5 | 7 |
|---|---|---|---|---|---|
| k = | −4.0732E+00 | −1.0000E+00 | 5.4853E+00 | −9.0000E+01 | −1.6518E+01 |
| A4 = | 1.2751E−01 | −3.6131E−02 | −1.5012E−01 | −3.8374E−01 | −8.8850E−02 |
| A6 = | −6.7596E−02 | −1.1795E−02 | 2.5329E−01 | 6.0974E−01 | −9.3131E−02 |
| A8 = | 9.9086E−02 | −6.9140E−02 | −3.0569E−01 | −5.6745E−01 | 1.5160E−01 |
| A10 = | −1.9511E−01 | 8.1485E−02 | 4.0578E−01 | 5.5582E−01 | −1.0983E−01 |

TABLE 10-continued

| Aspheric Coefficients | | | | | |
|---|---|---|---|---|---|
| A12 = | 2.0939E−01 | −1.4282E−01 | −4.3966E−01 | −4.0931E−01 | −7.1125E−03 |
| A14 = | −1.1437E−01 | 6.7290E−02 | 2.1806E−01 | 1.5674E−01 | |

| Surface # | 8 | 9 | 10 | 11 | 12 |
|---|---|---|---|---|---|
| k = | 6.8236E+00 | −4.9218E+00 | −6.5844E+00 | −1.5695E+00 | −1.1226E+01 |
| A4 = | 1.2007E−01 | −2.8030E−01 | −4.8641E−01 | −4.2548E−01 | −8.0298E−02 |
| A6 = | −2.5117E−01 | 6.1678E−01 | 8.3317E−01 | 4.4299E−01 | 2.6739E−02 |
| A8 = | 4.9408E−02 | −1.4062E+00 | −1.1613E+00 | −4.8831E−01 | −8.9039E−03 |
| A10 = | 6.0164E−02 | 1.6653E+00 | 9.7074E−01 | 3.8931E−01 | 1.9378E−03 |
| A12 = | −3.8329E−02 | −8.8929E−01 | −3.9408E−01 | −1.9694E−01 | −3.0162E−04 |
| A14 = | | 1.7564E−01 | 6.0891E−02 | 5.3693E−02 | 2.9401E−05 |
| A16 = | | | | −5.8392E−03 | −1.1682E−06 |

In the image capturing optical lens system according to the 5th embodiment, the definitions of these parameters shown in the following table are the same as those stated in the 1st embodiment with corresponding values for the 5th embodiment. Moreover, these parameters can be calculated from Table 9 and Table 10 as the following values and satisfy the following relationships:

| f [mm] | 3.83 | CT5/R3 | −0.22 |
|---|---|---|---|
| Fno | 2.08 | R10/R9 | 0.84 |
| HFOV [deg.] | 39.3 | f/f4 | −0.36 |
| N5 | 1.634 | A/CT4 | −0.77 |
| N5-N1 | 0.090 | Yc52/f | 0.29 |
| (V4 + V5)/V1 | 0.85 | SD52/ImgH | 0.691 |
| CT4/CT5 | 0.40 | | |

6th Embodiment

Figure 6A:
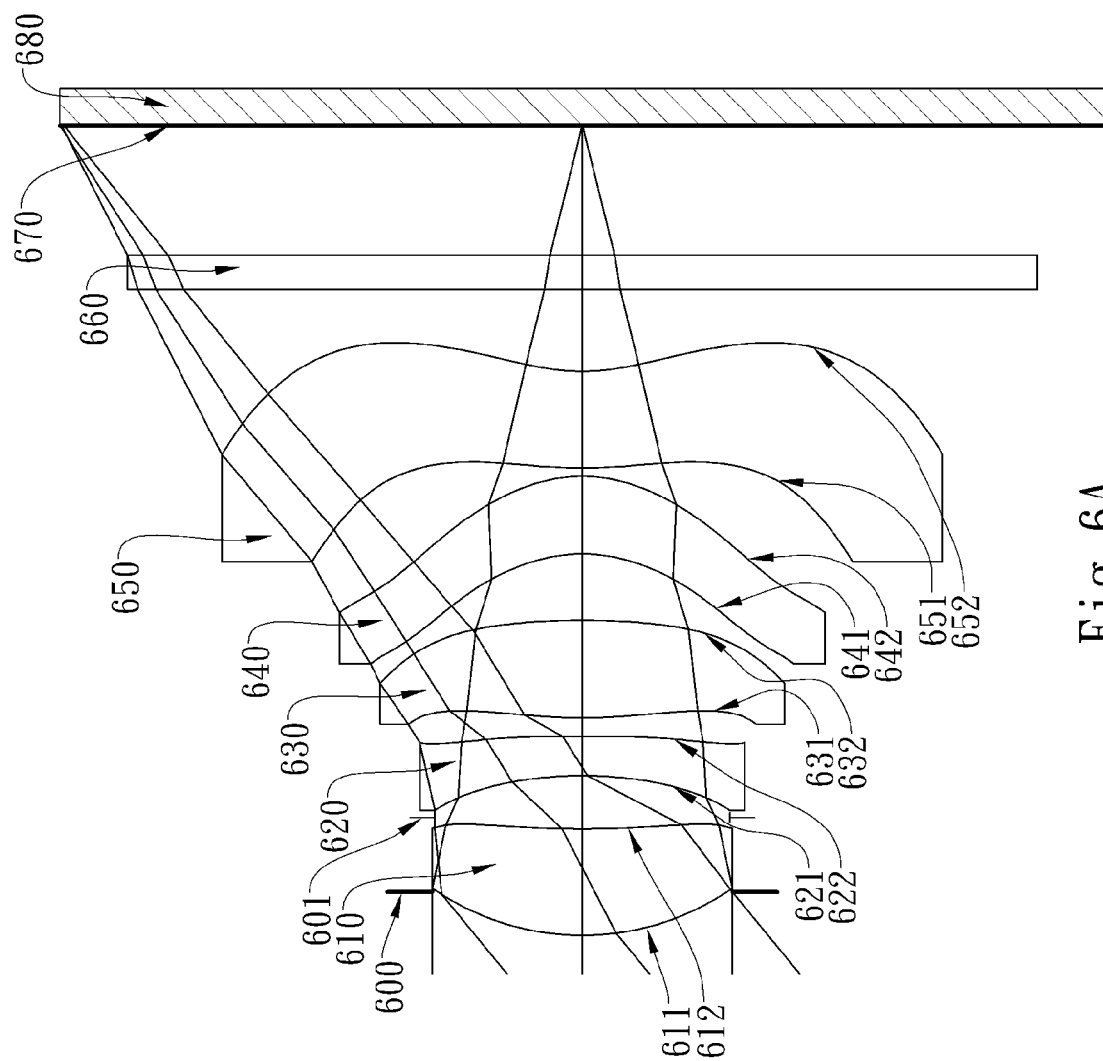
FIG. 6A is a schematic view of an image capturing optical lens system according to the 6th embodiment of the present disclosure.
Figure 6B:
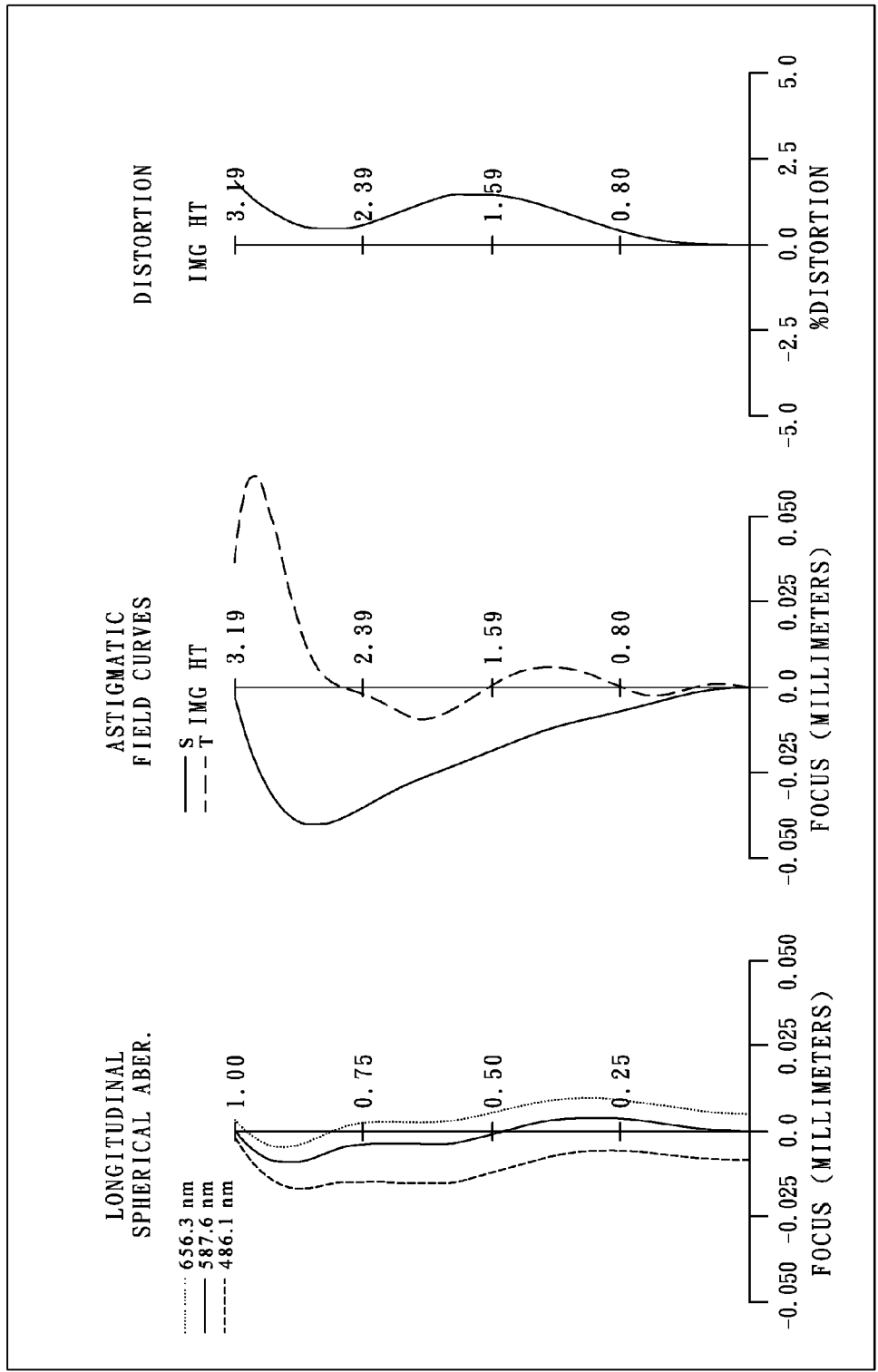
FIG. 6B shows spherical aberration curves, astigmatic field curves and a distortion curve of the image capturing optical lens system according to the 6th embodiment.

FIG. 6A is a schematic view of an image capturing optical lens system according to the 6th embodiment of the present disclosure. FIG. 6B shows spherical aberration curves, astigmatic field curves and a distortion curve of the image capturing optical lens system according to the 6th embodiment. In FIG. 6A, the image capturing optical lens system includes five lens elements with refractive power, in order from an object side to an image side, an aperture stop 600, a first lens element 610, a stop 601, a second lens element 620, a third lens element 630, a fourth lens element 640, a fifth lens element 650, an IR-cut filter 660, an image plane 670, and an image sensor 680.

The first lens element 610 with positive refractive power has a convex object-side surface 611 and a concave image-side surface 612. The first lens element 610 is made of plastic material and has the object-side surface 611 and the image-side surface 612 being aspheric.

The second lens element 620 with negative refractive power has a concave object-side surface 621 and a convex image-side surface 622. The second lens element 620 is made of plastic material and has the object-side surface 621 and the image-side surface 622 being aspheric.

The third lens element 630 with positive refractive power has a convex object-side surface 631 and a convex image-side surface 632. The third lens element 630 is made of plastic material and has the object-side surface 631 and the image-side surface 632 being aspheric.

The fourth lens element 640 with positive refractive power has a concave object-side surface 641 and a convex image-side surface 642. The fourth lens element 640 is made of plastic material and has the object-side surface 641 and the image-side surface 642 being aspheric.

The fifth lens element 650 with negative refractive power has a convex object-side surface 651 and a concave image-side surface 652. The fifth lens element 650 is made of plastic material and has the object-side surface 651 and the image-side surface 652 being aspheric. Furthermore, the fifth lens element 650 has at least one inflection point on the image-side surface 652 thereof.

The refractive index of the second lens element 620, the fourth lens element 640 and the fifth lens element 650 are all larger than 1.6. Furthermore, the IR-cut filter 660 made of glass material is located between the fifth lens element 650 and the image plane 670, and will not affect a focal length of the image capturing optical lens system.

The detailed optical data of the 6th embodiment are shown in Table 11, and the aspheric surface data are shown in Table 12 below.

TABLE 11

6th Embodiment
f = 3.81 mm, Fno = 2.08, HFOV = 39.4 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.265 | | | | |
| 2 | Lens 1 | 1.609 | (ASP) | 0.649 | Plastic | 1.544 | 55.9 | 3.84 |
| 3 | | 6.006 | (ASP) | 0.069 | | | | |
| 4 | stop | Plano | | 0.256 | | | | |
| 5 | Lens 2 | −2.681 | (ASP) | 0.241 | Plastic | 1.634 | 23.8 | −4.35 |
| 6 | | −100.000 | (ASP) | 0.112 | | | | |
| 7 | Lens 3 | 2.859 | (ASP) | 0.596 | Plastic | 1.544 | 55.9 | 3.34 |
| 8 | | −4.611 | (ASP) | 0.406 | | | | |
| 9 | Lens 4 | −0.930 | (ASP) | 0.474 | Plastic | 1.634 | 23.8 | 5.81 |

TABLE 11-continued

6th Embodiment
f = 3.81 mm, Fno = 2.08, HFOV = 39.4 deg.

| Surface # | | Curvature Radius | | Thickness | Material | Index | Abbe # | Focal length |
|---|---|---|---|---|---|---|---|---|
| 10 | | −0.889 | (ASP) | 0.050 | | | | |
| 11 | Lens 5 | 2.644 | (ASP) | 0.590 | Plastic | 1.634 | 23.8 | −3.97 |
| 12 | | 1.178 | (ASP) | 0.500 | | | | |
| 13 | IR-cut filter | Plano | | 0.210 | Glass | 1.517 | 64.2 | — |
| 14 | | Plano | | 0.790 | | | | |
| 15 | Image | Plano | | — | | | | |

Note:
Reference wavelength (d-line) is 587.6 nm.
Half of the diameter of the stop at Surface 4 is 0.900 mm.

TABLE 12

Aspheric Coefficients

| Surface # | 2 | 3 | 5 | 6 | 7 |
|---|---|---|---|---|---|
| k = | −4.4008E+00 | −1.0000E+00 | 3.9550E−01 | −9.0000E+01 | −3.1417E+01 |
| A4 = | 1.3505E−01 | −2.2794E−02 | −1.1233E−01 | −2.8196E−01 | −9.3500E−02 |
| A6 = | −5.0508E−02 | −5.2846E−02 | 1.2368E−01 | 5.2154E−01 | −1.5880E−03 |
| A8 = | 7.9729E−02 | 5.0548E−02 | −1.1073E−01 | −6.1721E−01 | 8.3109E−02 |
| A10 = | −1.9439E−01 | −7.2576E−02 | 1.6393E−01 | 6.5195E−01 | −1.2871E−01 |
| A12 = | 2.6066E−01 | −1.1791E−01 | −4.2934E−01 | −4.9295E−01 | 2.9824E−02 |
| A14 = | −1.4071E−01 | 8.6809E−02 | 2.8949E−01 | 1.8654E−01 | |

| Surface # | 8 | 9 | 10 | 11 | 12 |
|---|---|---|---|---|---|
| k = | 4.0009E+00 | −1.8397E+00 | −3.1506E+00 | −3.7738E+00 | −8.1126E+00 |
| A4 = | 1.1872E−02 | 1.1838E−01 | −2.0098E−01 | −2.7829E−01 | −1.0907E−01 |
| A6 = | −1.8912E−01 | −5.7638E−01 | 1.5263E−01 | 1.7152E−01 | 5.0957E−02 |
| A8 = | 1.8351E−01 | 6.7030E−01 | −1.8971E−01 | −8.9855E−02 | −2.2083E−02 |
| A10 = | −9.9426E−02 | −2.9498E−01 | 1.9579E−01 | 2.4902E−02 | 5.9007E−03 |
| A12 = | 2.1156E−02 | 5.3565E−02 | −8.3819E−02 | −3.7111E−03 | −9.5221E−04 |
| A14 = | | −4.8606E−03 | 1.2224E−02 | 3.3923E−04 | 8.2497E−05 |
| A16 = | | | | −1.4769E−05 | −2.8401E−06 |

In the image capturing optical lens system according to the 6th embodiment, the definitions of these parameters shown in the following table are the same as those stated in the 1st embodiment with corresponding values for the 6th embodiment. Moreover, these parameters can be calculated from Table 11 and Table 12 as the following values and satisfy the following relationships:

| f [mm] | 3.81 | CT5/R3 | −0.22 |
|---|---|---|---|
| Fno | 2.08 | R10/R9 | 0.45 |
| HFOV [deg.] | 39.4 | f/f4 | 0.66 |
| N5 | 1.634 | Δ/CT4 | −0.76 |
| N5−N1 | 0.090 | Yc52/f | 0.30 |
| (V4 + V5)/V1 | 0.85 | SD52/ImgH | 0.690 |
| CT4/CT5 | 0.80 | | |

7th Embodiment

Figure 7A:
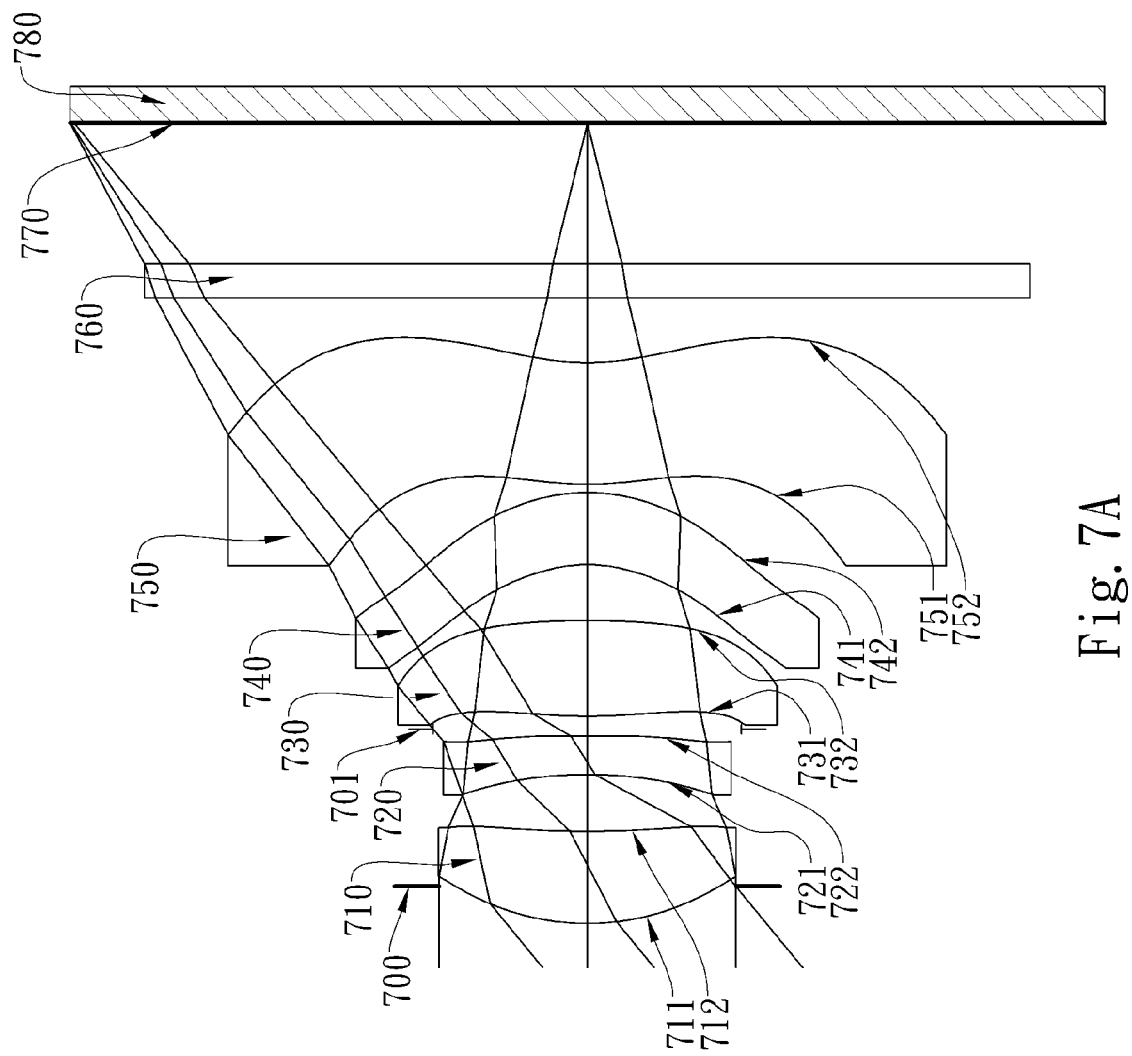
FIG. 7A is a schematic view of an image capturing optical lens system according to the 7th embodiment of the present disclosure.
Figure 7B:
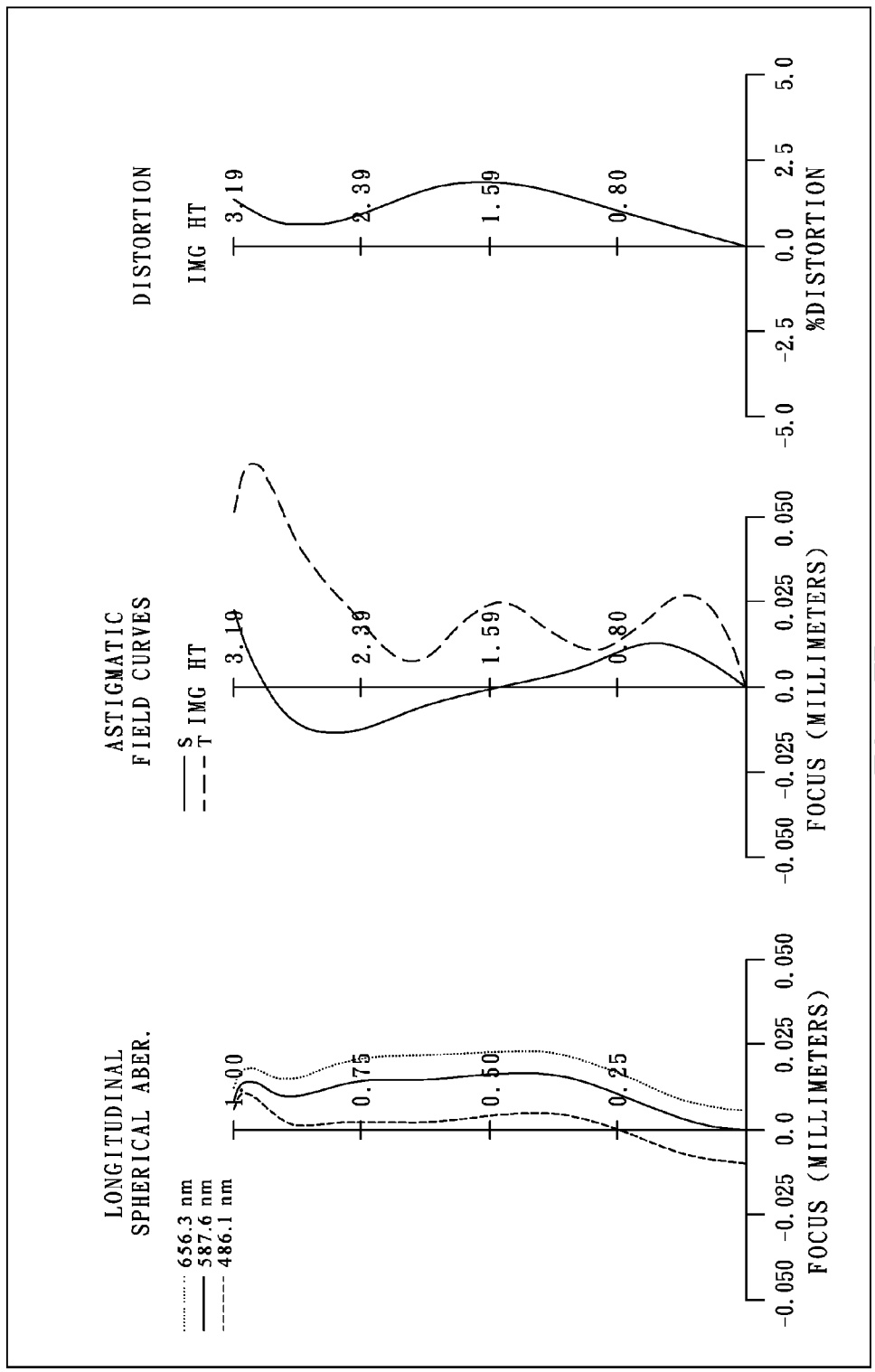
FIG. 7B shows spherical aberration curves, astigmatic field curves and a distortion curve of the image capturing optical lens system according to the 7th embodiment.

FIG. 7A is a schematic view of an image capturing optical lens system according to the 7th embodiment of the present disclosure. FIG. 7B shows spherical aberration curves, astigmatic field curves and a distortion curve of the image capturing optical lens system according to the 7th embodiment. In FIG. 7A, the image capturing optical lens system includes five lens elements with refractive power, in order from an object side to an image side, an aperture stop 700, a first lens element 710, a second lens element 720, a stop 701, a third lens element 730, a fourth lens element 740, a fifth lens element 750, an IR-cut filter 760, an image plane 770, and an image sensor 780.

The first lens element 710 with positive refractive power has a convex object-side surface 711 and a concave image-side surface 712. The first lens element 710 is made of plastic material and has the object-side surface 711 and the image-side surface 712 being aspheric.

The second lens element 720 with negative refractive power has a concave object-side surface 721 and a convex image-side surface 722. The second lens element 720 is made of plastic material and has the object-side surface 721 and the image-side surface 722 being aspheric.

The third lens element 730 with positive refractive power has a convex object-side surface 731 and a convex image-side surface 732. The third lens element 730 is made of plastic material and has the object-side surface 731 and the image-side surface 732 being aspheric.

The fourth lens element 740 with negative refractive power has a concave object-side surface 741 and a convex image-side surface 742. The fourth lens element 740 is made of plastic material and has the object-side surface 741 and the image-side surface 742 being aspheric.

The fifth lens element 750 with negative refractive power has a convex object-side surface 751 and a concave image-side surface 752. The fifth lens element 750 is made of plastic material and has the object-side surface 751 and the image-side surface 752 being aspheric. Furthermore, the fifth lens element 750 has at least one inflection point on the image-side surface 752 thereof.

The refractive index of the second lens element 720, the fourth lens element 740 and the fifth lens element 750 are all larger than 1.6. Furthermore, the IR-cut filter 760 made of glass material is located between the fifth lens element 750 and the image plane 770, and will not affect a focal length of the image capturing optical lens system.

The detailed optical data of the 7th embodiment are shown in Table 13, and the aspheric surface data are shown in Table 14 below.

TABLE 13

7th Embodiment
f = 3.81 mm, Fno = 2.08, HFOV = 39.4 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.228 | | | | |
| 2 | Lens 1 | 1.544 | (ASP) | 0.568 | Plastic | 1.544 | 55.9 | 3.76 |
| 3 | | 5.463 | (ASP) | 0.350 | | | | |
| 4 | Lens 2 | −3.063 | (ASP) | 0.240 | Plastic | 1.634 | 23.8 | −4.99 |
| 5 | | −100.000 | (ASP) | 0.041 | | | | |
| 6 | stop | Plano | | 0.080 | | | | |
| 7 | Lens 3 | 3.036 | (ASP) | 0.590 | Plastic | 1.544 | 55.9 | 3.61 |
| 8 | | −5.182 | (ASP) | 0.346 | | | | |
| 9 | Lens 4 | −0.878 | (ASP) | 0.445 | Plastic | 1.634 | 23.8 | −18.93 |
| 10 | | −1.134 | (ASP) | 0.050 | | | | |
| 11 | Lens 5 | 1.953 | (ASP) | 0.751 | Plastic | 1.634 | 23.8 | −28.92 |
| 12 | | 1.501 | (ASP) | 0.400 | | | | |
| 13 | IR-cut filter | Plano | | 0.210 | Glass | 1.517 | 64.2 | — |
| 14 | | Plano | | 0.870 | | | | |
| 15 | Image | Plano | | — | | | | |

Note:
Reference wavelength (d-line) is 587.6 nm.
Half of the diameter of the stop at Surface 6 is 0.950 mm.

TABLE 14

Aspheric Coefficients

| Surface # | 2 | 3 | 4 | 5 | 7 |
|---|---|---|---|---|---|
| k = | −3.9282E+00 | −1.0000E+00 | 2.6830E+00 | 2.0000E+01 | −3.9770E+01 |
| A4 = | 1.3527E−01 | −3.4006E−02 | −1.4691E−01 | −3.3391E−01 | −1.3237E−01 |
| A6 = | −5.7250E−02 | −3.4010E−02 | 2.5137E−01 | 5.9594E−01 | −3.2488E−02 |
| A8 = | 8.6064E−02 | −1.9376E−02 | −2.4743E−01 | −5.5588E−01 | 1.3786E−01 |
| A10 = | −1.9452E−01 | 3.1780E−02 | 3.6086E−01 | 5.5907E−01 | −1.5922E−01 |
| A12 = | 2.4712E−01 | −1.5873E−01 | −5.0342E−01 | −4.4146E−01 | 8.6774E−03 |
| A14 = | −1.4672E−01 | 9.3581E−02 | 2.8811E−01 | 1.9053E−01 | |

| Surface # | 8 | 9 | 10 | 11 | 12 |
|---|---|---|---|---|---|
| k = | 1.6132E+01 | −4.3925E+00 | −6.4166E+00 | −4.6622E+00 | −5.8871E+00 |
| A4 = | 2.1204E−02 | −1.2459E−01 | −4.1211E−01 | −3.5262E−01 | −1.3814E−01 |
| A6 = | −2.1503E−01 | −1.8947E−01 | 4.7048E−01 | 2.3340E−01 | 7.1013E−02 |
| A8 = | 1.5835E−01 | 1.7594E−01 | −4.9709E−01 | −1.2218E−01 | −3.0015E−02 |
| A10 = | −5.7390E−02 | 9.4370E−02 | 3.7810E−01 | 3.5698E−02 | 8.1020E−03 |
| A12 = | 3.1625E−03 | −1.0733E−01 | −1.4296E−01 | −5.7084E−03 | −1.3370E−03 |
| A14 = | | 2.0486E−02 | 1.9974E−02 | 5.6094E−04 | 1.1990E−04 |
| A16 = | | | | −2.6300E−05 | −4.3115E−06 |

In the image capturing optical lens system according to the 7th embodiment, the definitions of these parameters shown in the following table are the same as those stated in the 1st embodiment with corresponding values for the 7th embodiment. Moreover, these parameters can be calculated from Table 13 and Table 14 as the following values and satisfy the following relationships:

| f [mm] | 3.81 | CT5/R3 | −0.25 |
|---|---|---|---|
| Fno | 2.08 | R10/R9 | 0.77 |
| HFOV [deg.] | 39.4 | f/f4 | −0.20 |
| N5 | 1.634 | A/CT4 | −0.74 |
| N5-N1 | 0.090 | Yc52/f | 0.30 |
| (V4 + V5)/V1 | 0.85 | SD52/ImgH | 0.696 |
| CT4/CT5 | 0.59 | | |

8th Embodiment

Figure 8A:
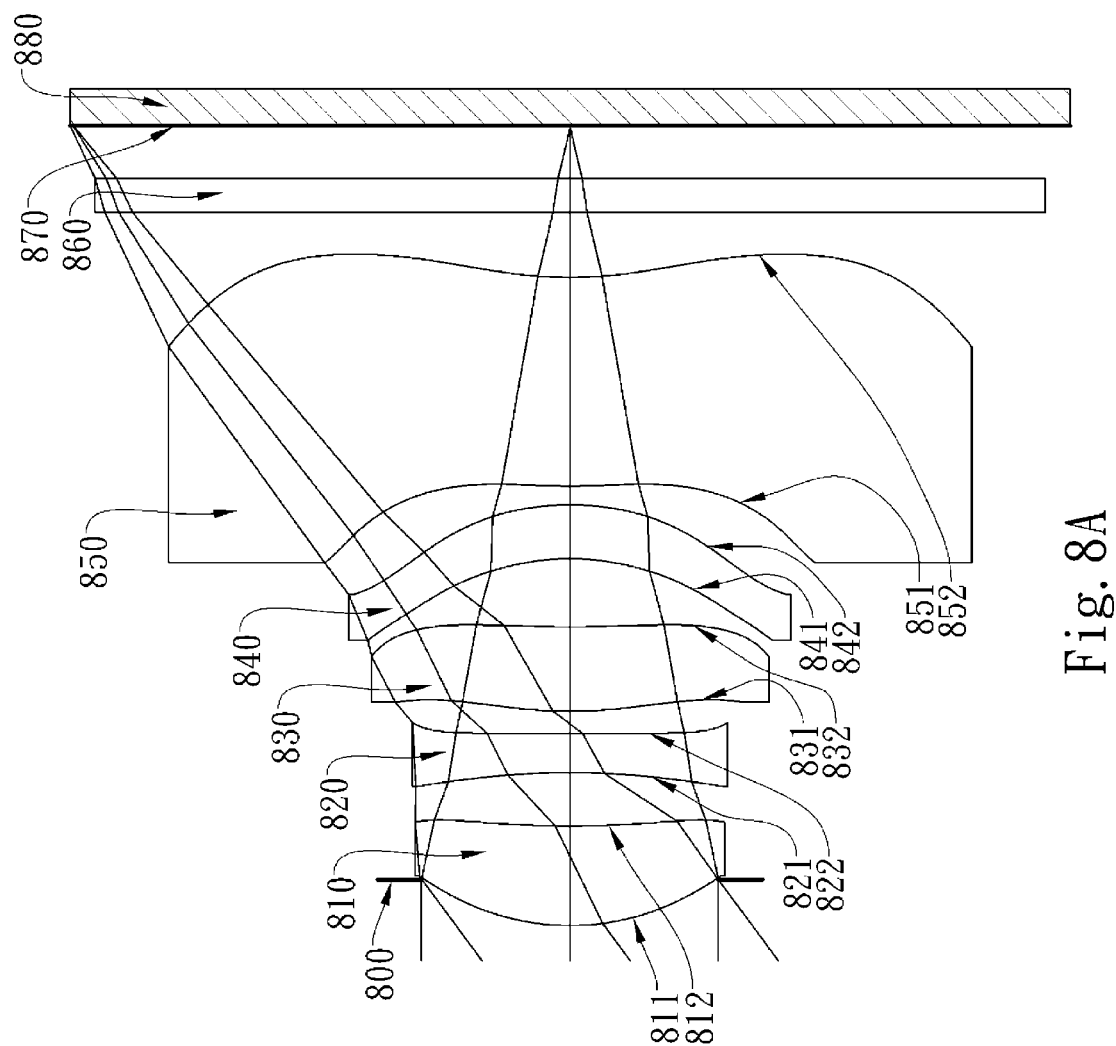
FIG. 8A is a schematic view of an image capturing optical lens system according to the 8th embodiment of the present disclosure.
Figure 8B:
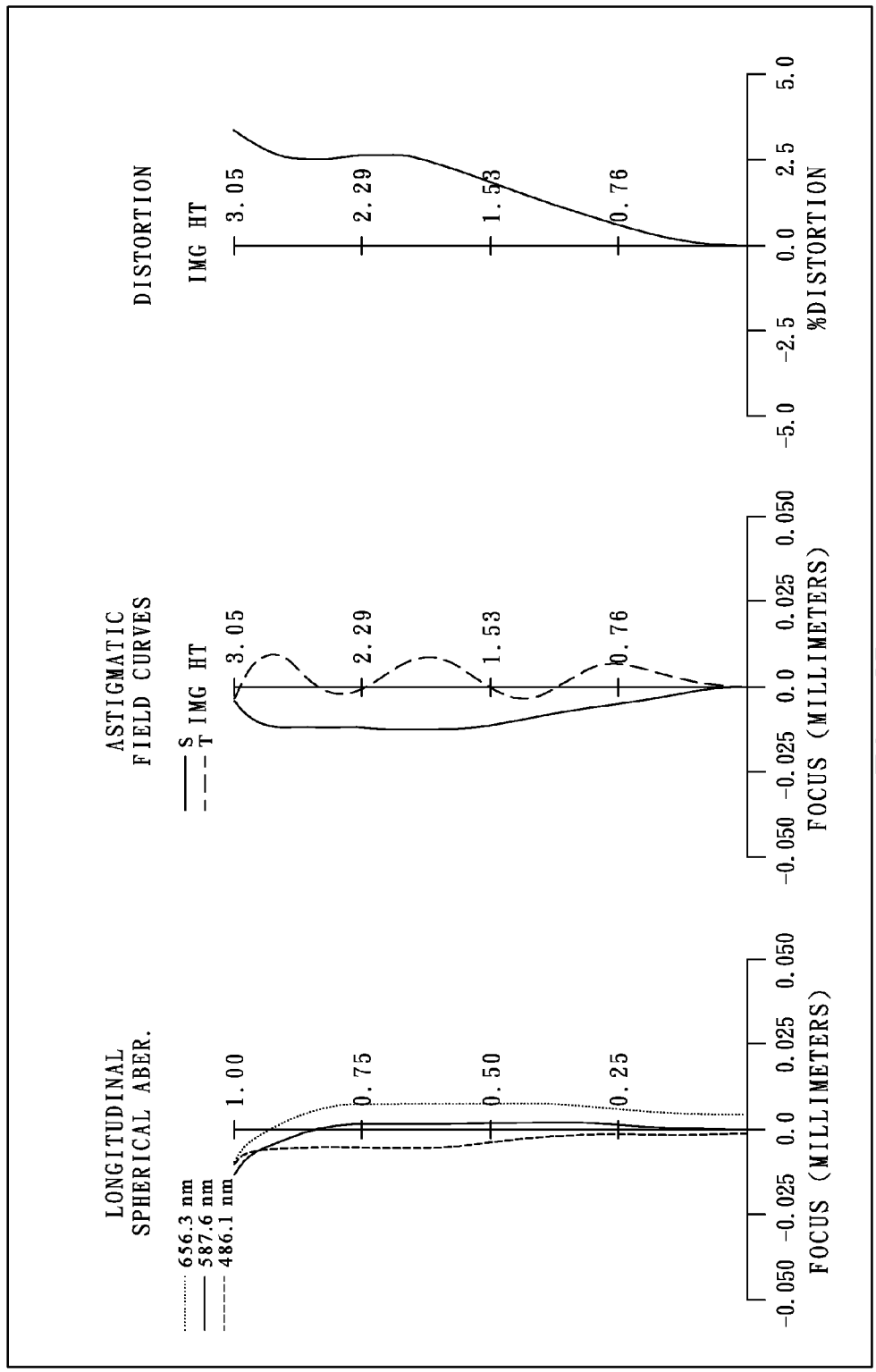
FIG. 8B shows spherical aberration curves, astigmatic field curves and a distortion curve of the image capturing optical lens system according to the 8th embodiment.

FIG. 8A is a schematic view of an image capturing optical lens system according to the 8th embodiment of the present disclosure. FIG. 8B shows spherical aberration curves, astigmatic field curves and a distortion curve of the image capturing optical lens system according to the 8th embodiment. In FIG. 8A, the image capturing optical lens system includes five lens elements with refractive power, in order from an object side to an image side, an aperture stop 800, a first lens element 810, a second lens element 820, a third lens element 830, a fourth lens element 840, a fifth lens element 850, an IR-cut filter 860, an image plane 870, and an image sensor 880.

The first lens element 810 with positive refractive power has a convex object-side surface 811 and a concave image-side surface 812. The first lens element 810 is made of plastic material and has the object-side surface 811 and the image-side surface 812 being aspheric.

The second lens element 820 with negative refractive power has a concave object-side surface 821 and a concave image-side surface 822. The second lens element 820 is made of plastic material and has the object-side surface 821 and the image-side surface 822 being aspheric.

The third lens element 830 with positive refractive power has a convex object-side surface 831 and a concave image-side surface 832. The third lens element 830 is made of plastic material and has the object-side surface 831 and the image-side surface 832 being aspheric.

The fourth lens element 840 with negative refractive power has a concave object-side surface 841 and a convex image-side surface 842. The fourth lens element 840 is made of plastic material and has the object-side surface 841 and the image-side surface 842 being aspheric.

The fifth lens element 850 with negative refractive power has a convex object-side surface 851 and a concave image-side surface 852. The fifth lens element 850 is made of plastic material and has the object-side surface 851 and the image-side surface 852 being aspheric. Furthermore, the fifth lens element 850 has at least one inflection point on the image-side surface 852 thereof.

The refractive index of the second lens element 820, the fourth lens element 840 and the fifth lens element 850 are all larger than 1.6. Furthermore, the IR-cut filter 860 made of glass material is located between the fifth lens element 850 and the image plane 870, and will not affect a focal length of the image capturing optical lens system.

The detailed optical data of the 8th embodiment are shown in Table 15, and the aspheric surface data are shown in Table 16 below.

TABLE 15

8th Embodiment
f = 4.00 mm, Fno = 2.20, HFOV = 36.4 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.284 | | | | |
| 2 | Lens 1 | 1.516 | (ASP) | 0.611 | Plastic | 1.535 | 56.3 | 3.65 |
| 3 | | 5.845 | (ASP) | 0.327 | | | | |
| 4 | Lens 2 | −5.170 | (ASP) | 0.241 | Plastic | 1.650 | 21.4 | −6.09 |
| 5 | | 17.144 | (ASP) | 0.136 | | | | |
| 6 | Lens 3 | 2.334 | (ASP) | 0.519 | Plastic | 1.544 | 55.9 | 5.55 |
| 7 | | 9.503 | (ASP) | 0.420 | | | | |
| 8 | Lens 4 | −1.415 | (ASP) | 0.330 | Plastic | 1.634 | 23.8 | −21.47 |
| 9 | | −1.722 | (ASP) | 0.115 | | | | |
| 10 | Lens 5 | 4.017 | (ASP) | 1.280 | Plastic | 1.632 | 23.4 | −11.38 |
| 11 | | 2.259 | (ASP) | 0.400 | | | | |
| 12 | IR-cut filter | Plano | | 0.210 | Glass | 1.517 | 64.2 | — |
| 13 | | Plano | | 0.324 | | | | |
| 14 | Image | Plano | | — | | | | |

Note:
Reference wavelength (d-line) is 587.6 nm.

TABLE 16

Aspheric Coefficients

| Surface # | 2 | 3 | 4 | 5 | 6 |
|---|---|---|---|---|---|
| k = | −3.9818E+00 | −1.7061E+00 | −3.5824E+01 | 2.0000E+01 | −2.1017E+01 |
| A4 = | 1.4246E−01 | −1.5545E−02 | −7.6653E−02 | −1.8522E−01 | −5.3491E−02 |
| A6 = | −7.1906E−02 | −1.4913E−03 | 2.1414E−01 | 4.7986E−01 | −6.6256E−02 |
| A8 = | 1.0599E−01 | −7.3633E−02 | −3.8298E−01 | −5.9342E−01 | 1.5585E−01 |
| A10 = | −1.7844E−01 | 8.8421E−02 | 4.9672E−01 | 6.1006E−01 | −1.7957E−01 |
| A12 = | 1.7677E−01 | −1.3078E−01 | −4.5093E−01 | −4.0835E−01 | 7.1914E−02 |
| A14 = | −8.5634E−02 | 5.3982E−02 | 1.8606E−01 | 1.6102E−01 | |

| Surface # | 7 | 8 | 9 | 10 | 11 |
|---|---|---|---|---|---|
| k = | −7.0867E+00 | −1.3570E+01 | −1.6213E+01 | −1.0910E+00 | −8.1233E+00 |
| A4 = | −1.7531E−02 | −3.3757E−01 | −5.1320E−01 | −3.9343E−01 | −6.7665E−02 |
| A6 = | −1.2248E−01 | 7.1389E−01 | 8.3645E−01 | 4.1669E−01 | 2.5260E−02 |
| A8 = | 7.0431E−02 | −1.4907E+00 | −1.1552E+00 | −4.6568E−01 | −8.5036E−03 |
| A10 = | −4.2108E−03 | 1.6570E+00 | 9.6663E−01 | 3.8539E−01 | 2.0254E−03 |
| A12 = | −1.1964E−02 | −8.5475E−01 | −3.9810E−01 | −1.9879E−01 | −3.4099E−04 |
| A14 = | | 1.6452E−01 | 6.3441E−02 | 5.3846E−02 | 3.3748E−05 |
| | | | | −5.6563E−03 | −1.3979E−06 |

In the image capturing optical lens system according to the 8th embodiment, the definitions of these parameters shown in the following table are the same as those stated in the 1st embodiment with corresponding values for the 8th embodiment. Moreover, these parameters can be calculated from Table 15 and Table 16 as the following values and satisfy the following relationships:

| f [mm] | 4.00 | CT5/R3 | −0.25 |
|---|---|---|---|
| Fno | 2.20 | R10/R9 | 0.56 |
| HFOV [deg.] | 36.4 | f/f4 | −0.19 |
| N5 | 1.632 | Δ/CT4 | −0.67 |
| N5-N1 | 0.097 | Yc52/f | 0.33 |
| (V4 + V5)/V1 | 0.84 | SD52/ImgH | 0.807 |
| CT4/CT5 | 0.26 | | |

It is to be noted that TABLES 1-16 show different data of the different embodiments; however, the data of the different embodiments are obtained from experiments. Therefore, any imaging lens system of the same structure is considered to be within the scope of the present disclosure even if it uses different data. The embodiments depicted above and the appended drawings are exemplary and are not intended to limit the scope of the present disclosure.

What is claimed is:

1. An image capturing optical lens system comprising five lens elements with refractive power, in order from an object side to an image side:
    a first lens element with positive refractive power having a convex object-side surface;
    a second lens element with negative refractive power having a concave object-side surface;
    a third lens element having refractive power;
    a fourth lens element with refractive power having a concave object-side surface and a convex image-side surface; and
    a fifth lens element with refractive power having a convex object-side surface and a concave image-side surface, wherein an object-side surface and the image-side surface of the fifth lens element are aspheric, and the fifth lens element has at least one inflection point on the image-side surface thereof;
    wherein the image capturing optical lens system has a total of five lens elements with refractive power; and
    wherein a refractive index of the fifth lens element is N5, and the following relationship is satisfied:

$1.60<N5<1.75.$

2. The image capturing optical lens system of claim 1, wherein the third lens element has positive refractive power.

3. The image capturing optical lens system of claim 2, wherein the third lens element has a convex object-side surface.

4. The image capturing optical lens system of claim 2, wherein the refractive index of the fifth lens element is N5, a refractive index of the first lens element is N1, and the following relationship is satisfied:

$0.06<N5-N1<0.25.$

5. The image capturing optical lens system of claim 2, wherein a focal length of the image capturing optical lens system is f, a focal length of the fourth lens element is f4, and the following relationship is satisfied:

$-1.0<f/f4<0.70.$

6. The image capturing optical lens system of claim 2, wherein a distance in parallel with an optical axis from an axial vertex on the object-side surface of the fourth lens element to a maximum effective diameter position on the image-side surface of the fourth lens element is Δ, a central thickness of the fourth lens element is CT4, and the following relationship is satisfied:

$-2.0<\Delta/CT4<-0.20.$

7. The image capturing optical lens system of claim 1, wherein a central thickness of the fifth lens element is CT5, a curvature radius of the object-side surface of the second lens element is R3, and the following relationship is satisfied:

$-0.60<CT5/R3<-0.05.$

8. The image capturing optical lens system of claim 7, wherein a central thickness of the fourth lens element is CT4, the central thickness of the fifth lens element is CT5, and the following relationship is satisfied:

$0.20<CT4/CT5<0.65.$

9. The image capturing optical lens system of claim 7, wherein a focal length of the image capturing optical lens system is f, a focal length of the fourth lens element is f4, and the following relationship is satisfied:

$-1.0<f/f4<0.40.$

10. The image capturing optical lens system of claim 7, wherein a vertical distance between a non-axial critical point on the image-side surface of the fifth lens element and an optical axis is Yc52, a focal length of the image capturing optical lens system is f, and the following relationship is satisfied:

$0.1<Yc52/f<0.7.$

11. The image capturing optical lens system of claim 1, wherein a vertical distance between a maximum effective diameter position on the image-side surface of the fifth lens element and an optical axis is SD52, a maximum image height of the image capturing optical lens system is ImgH, and the following relationship is satisfied:

$0.60<SD52/ImgH<0.77.$

12. An image capturing optical lens system comprising five lens elements with refractive power, in order from an object side to an image side:
    a first lens element with positive refractive power having a convex object-side surface;
    a second lens element with negative refractive power having a concave image-side surface;
    a third lens element having refractive power;
    a fourth lens element with refractive power having a concave object-side surface and a convex image-side surface; and
    a fifth lens element with refractive power having a concave image-side surface, wherein an object-side surface and the image-side surface of the fifth lens element are aspheric, and the fifth lens element has at least one inflection point on the image-side surface thereof;
    wherein the image capturing optical lens system has a total of five lens elements with refractive power; and
    wherein a refractive index of the fifth lens element is N5, a focal length of the image capturing optical lens system is f, a focal length of the fourth lens element is f4, and the following relationships are satisfied:

$1.60<N5<1.75;$ and $-1.0<f/f4<0.40.$

13. The image capturing optical lens system of claim 12, wherein the fourth lens element has negative refractive power.

14. The image capturing optical lens system of claim 12, wherein the refractive index of the fifth lens element is N5, a refractive index of the first lens element is N1, and the following relationship is satisfied:

$$0.06 < N5 - N1 < 0.25.$$

15. The image capturing optical lens system of claim 12, comprising at least three lens elements with refractive power having refractive index larger than 1.60.

16. The image capturing optical lens system of claim 12, wherein a curvature radius of the image-side surface of the fifth lens element is R10, a curvature radius of the object-side surface of the fifth lens element is R9, and the following relationship is satisfied:

$$-0.20 < R10/R9 < 0.90.$$

17. The image capturing optical lens system of claim 16, wherein a distance in parallel with an optical axis from an axial vertex on the object-side surface of the fourth lens element to a maximum effective diameter position on the image-side surface of the fourth lens element is Δ, a central thickness of the fourth lens element is CT4, and the following relationship is satisfied:

$$-2.0 < \Delta/CT4 < -0.20.$$

18. The image capturing optical lens system of claim 16, wherein a vertical distance between a maximum effective diameter position on the image-side surface of the fifth lens element and an optical axis is SD52, a maximum image height of the image capturing optical lens system is ImgH, and the following relationship is satisfied:

$$0.60 < SD52/ImgH < 0.77.$$

19. An image capturing optical lens system comprising five lens elements with refractive power, in order from an object side to an image side:
   a first lens element with positive refractive power having a convex object-side surface;
   a second lens element with negative refractive power having a concave object-side surface;
   a third lens element with positive refractive power having a convex object-side surface;
   a fourth lens element with refractive power having a convex image-side surface; and
   a fifth lens element with refractive power having a concave image-side surface, wherein an object-side surface and the image-side surface of the fifth lens element are aspheric, and the fifth lens element has at least one inflection point on the image-side surface thereof;
   wherein the image capturing optical lens system has a total of five lens elements with refractive power; and
   wherein a refractive index of the fifth lens element is N5, a central thickness of the fifth lens element is CT5, a curvature radius of an object-side surface of the second lens element is R3, and the following relationships are satisfied:

$$1.60 < N5 < 1.75; \text{ and}$$

$$-0.60 < CT5/R3 < -0.05.$$

20. The image capturing optical lens system of claim 19, wherein the object-side surface of the fifth lens element is convex, a central thickness of the fourth lens element is CT4, the central thickness of the fifth lens element is CT5, and the following relationship is satisfied:

$$0.20 < CT4/CT5 < 0.65.$$

21. The image capturing optical lens system of claim 19, comprising at least three lens elements with refractive power having refractive index larger than 1.60.

22. The image capturing optical lens system of claim 19, wherein a focal length of the image capturing optical lens system is f, a focal length of the fourth lens element is f4, and the following relationship is satisfied:

$$-1.0 < f/f4 < 0.70.$$

23. The image capturing optical lens system of claim 19, wherein an Abbe number of the fourth lens element is V4, an Abbe number of the fifth lens element is V5, an Abbe number of the first lens element is V1, and the following relationship is satisfied:

$$0.7 < (V4+V5)/V1 < 1.0.$$

* * * * *